US010168728B2

(12) United States Patent
Kogo

(10) Patent No.: US 10,168,728 B2
(45) Date of Patent: Jan. 1, 2019

(54) POWER NETWORK SYSTEM, POWER IDENTIFICATION METHOD, AND POWER ROUTER

(71) Applicant: NEC Corporation, Tokyo (JP)

(72) Inventor: Takuma Kogo, Tokyo (JP)

(73) Assignee: NEC Corporation, Tokyo (JP)

( * ) Notice: Subject to any disclaimer, the term of this patent is extended or adjusted under 35 U.S.C. 154(b) by 574 days.

(21) Appl. No.: 14/763,045

(22) PCT Filed: Dec. 10, 2013

(86) PCT No.: PCT/JP2013/007251
§ 371 (c)(1),
(2) Date: Jul. 23, 2015

(87) PCT Pub. No.: WO2014/115218
PCT Pub. Date: Jul. 31, 2014

(65) Prior Publication Data
US 2015/0355667 A1 Dec. 10, 2015

(30) Foreign Application Priority Data

Jan. 25, 2013 (JP) .................................. 2013-012197

(51) Int. Cl.
*G05F 5/00* (2006.01)
*H02J 1/08* (2006.01)
(Continued)

(52) U.S. Cl.
CPC .................. *G05F 5/00* (2013.01); *H02J 1/08* (2013.01); *H02J 3/14* (2013.01); *H02J 13/0075* (2013.01);
(Continued)

(58) Field of Classification Search
CPC ..................................... G05F 5/00; H02J 1/08
See application file for complete search history.

(56) References Cited

U.S. PATENT DOCUMENTS 9,768,832 B2 * 9/2017 Nishibayashi ......... H04B 3/542
2007/0114954 A1 * 5/2007 Hampo ............... B60L 11/1868
318/105

(Continued)

FOREIGN PATENT DOCUMENTS

CA 2773994 3/2011
EP 2477297 7/2012
(Continued)

OTHER PUBLICATIONS

The Digital Grid Consortium, [Searched on Nov. 28, 2012], the Internet <URL: http://www.digitalgrid.org/index.php/jp/> (55 pages).
(Continued)

*Primary Examiner* — Daniel Kessie
(74) *Attorney, Agent, or Firm* — Wilmer Cutler Pickering Hale and Dorr LLP

(57) ABSTRACT

In a power network system (10A), a plurality of power routers including at least a first power router (100A) and a second power router (100B) are connected through respective input/output terminal parts in a multi-stage configuration. A predetermined amount of power is transmitted to the input/output terminal part of the power transmission destination (230A) through a first input/output terminal part (210A), the input/output terminal part of the second power transmission source (220A), and the DC bus (201A) in the second power router. The power network system includes as power information about power in the input/output terminal part of the power transmission destination, identification information of the first power transmission source (110A), and an intermediate measurement value of power received in the first input/output terminal part in a predetermined time period.

20 Claims, 34 Drawing Sheets

(51) Int. Cl.
*H02J 3/14* (2006.01)
*H02J 13/00* (2006.01)

(52) U.S. Cl.
CPC .......... *Y02B 70/3225* (2013.01); *Y04S 20/222* (2013.01); *Y10T 307/549* (2015.04)

(56) References Cited

U.S. PATENT DOCUMENTS

| | | |
|---|---|---|
| 2012/0173035 A1 | 7/2012 | Abe |
| 2013/0033111 A1* | 2/2013 | Kawamoto ............... G05F 1/67 |
| | | 307/66 |

FOREIGN PATENT DOCUMENTS

| | | |
|---|---|---|
| JP | 2011/061970 A | 3/2011 |
| JP | 2011/083085 | 4/2011 |
| JP | 4783453 B2 | 9/2011 |
| JP | 2012/095397 | 5/2012 |
| WO | WO-2011/030558 | 3/2011 |
| WO | WO-2011/042785 | 4/2011 |

OTHER PUBLICATIONS

International Search Report corresponding to PCT/JP2013/007251, dated Mar. 4, 2014, 1 page.

* cited by examiner

|  | | Second Power Router | | |
|---|---|---|---|---|
|  | | Master Leg | Designated Power Transmission /Reception Leg | Stand-Alone Leg |
| First Power Router | Master Leg | NOT CONNECTABLE | NOT CONNECTABLE | CONNECTABLE |
|  | Designated Power Transmission /Reception Leg | NOT CONNECTABLE | CONNECTABLE | CONNECTABLE |
|  | Stand-Alone Leg | CONNECTABLE | CONNECTABLE | NOT CONNECTABLE |

Fig. 10

| MEASUREMENT ID | POWER ROUTER ID | INPUT/OUTPUT TERMINAL ID | INPUT/ OUTPUT | START TIME | END TIME | ACTIVE POWER (kWh) |
|---|---|---|---|---|---|---|
| ST1 | 100A | 110A | INPUT | 10:00 | 10:30 | 7.0 |
| ST2 | 100A | 120A | OUTPUT | 10:00 | 10:30 | 7.0 |
| ST3 | 200A | 210A | INPUT | 10:00 | 10:30 | 7.0 |
| ST4 | 200A | 220A | INPUT | 10:00 | 10:30 | 3.0 |
| ST5 | 200A | 230A | OUTPUT | 10:00 | 10:30 | 10.0 |

Fig. 15

| ROUTE ID | POWER TRANSMISSION SOURCE | | POWER TRANSMISSION DESTINATION | |
|---|---|---|---|---|
| | POWER ROUTER ID | INPUT/OUTPUT TERMINAL ID | POWER ROUTER ID | INPUT/OUTPUT TERMINAL ID |
| RT1 | 100A | 110A | 100A | 120A |
| RT2 | 100A | 120A | 200A | 210A |
| RT3 | 200A | 210A | 200A | 230A |
| RT4 | 200A | 220A | 200A | 230A |

Fig. 16

| MEASUREMENT ID | POWER ROUTER ID | INPUT/OUTPUT TERMINAL ID | INPUT/OUTPUT | START TIME | END TIME | ACTIVE POWER (kWh) |
|---|---|---|---|---|---|---|
| MT1 | 100A | 110A | INPUT | 10:00 | 10:30 | 7.0 |
| MT2 | 100A | 120A | OUTPUT | 10:00 | 10:30 | 7.0 |
| MT3 | 200A | 210A | INPUT | 10:00 | 10:30 | 7.0 |
| MT4 | 200A | 220A | INPUT | 10:00 | 10:30 | 3.0 |
| MT5 | 200A | 230A | OUTPUT | 10:00 | 10:30 | 10.0 |

Fig. 17

| POWER TAG ID | POWER ROUTER ID | INPUT/OUTPUT TERMINAL ID | INPUT /OUTPUT | DATE | TIME PERIOD | POWER TRANSMISSION SOURCE | BREAKDOWN POWER (kWh) |
|---|---|---|---|---|---|---|---|
| PT1 | 100A | 110A | INPUT | 20121114 | 10:00-10:30 | BACKBONE SYSTEM | 7.0 |
| PT2 | 100A | 120A | OUTPUT | 20121114 | 10:00-10:30 | 110A | 7.0 |
| PT3 | 200A | 210A | INPUT | 20121114 | 10:00-10:30 | 120A | 7.0 |
| PT4 | 200A | 220A | INPUT | 20121114 | 10:00-10:30 | STORAGE BATTERY | 3.0 |
| PT5 | 200A | 230A | OUTPUT | 20121114 | 10:00-10:30 | 210A | 7.0 |
| PT6 | 200A | 230A | OUTPUT | 20121114 | 10:00-10:30 | 220A | 3.0 |

Fig. 18

| CONTRACT ID | POWER TRANSMITTER ID | POWER RECEIVER ID | DATE | TIME PERIOD | CONTRACT TIME (MINUTE) | POWER (kWh) | PRICE (YEN/kWh) | $CO_2$ EMISSION COEFFICIENT (g/kWh) | POWER GENERATION ORIGIN |
|---|---|---|---|---|---|---|---|---|---|
| C1 | a | b | 20120817 | 12:00-13:30 | 90 | 12.0 | 20.0 | 570.0 | THERMAL POWER |
| C2 | c | d | 20121005 | 10:00-11:00 | 60 | 8.0 | 16.3 | 180.0 | NUCLEAR POWER |
| C3 | e | f | 20121114 | 10:00-10:30 | 30 | 10.0 | 25.5 | 60.0 | SOLAR POWER |

| SETTING ID | POWER ROUTER ID | INPUT/ OUTPUT TERMINAL ID | INPUT/OUTPUT | START TIME | END TIME | ACTIVE POWER (kWh) | REACTIVE POWER (kvarh) |
|---|---|---|---|---|---|---|---|
| ST1 | 100B | 110B | INPUT | 10:00 | 10:30 | 10.0 | 0.0 |
| ST2 | 100B | 140B | OUTPUT | 10:00 | 10:30 | 10.0 | 0.0 |
| ST3 | 200B | 210B | INPUT | 10:00 | 10:30 | 10.0 | 0.0 |
| ST4 | 200B | 230B | OUTPUT | 10:00 | 10:30 | 10.0 | 0.0 |

Fig. 29

| SETTING ID | CONTRACT ID |
|---|---|
| ST1 | C3 |

| ROUTE ID | POWER TRANSMISSION SOURCE | | POWER TRANSMISSION DESTINATION | |
| --- | --- | --- | --- | --- |
| | POWER ROUTER ID | INPUT/OUTPUT TERMINAL ID | POWER ROUTER ID | INPUT/OUTPUT TERMINAL ID |
| RT1 | 100B | 110B | 100B | 140B |
| RT2 | 100B | 120B | 100B | 140B |
| RT3 | 100B | 140B | 200B | 210B |
| RT4 | 200B | 210B | 200B | 230B |
| RT5 | 200B | 220B | 200B | 230B |

Fig. 30

| MEASUREMENT ID | POWER ROUTER ID | INPUT/OUTPUT TERMINAL ID | INPUT/OUTPUT | START TIME | END TIME | ACTIVE POWER (kWh) | REACTIVE POWER (kvarh) | status |
|---|---|---|---|---|---|---|---|---|
| MT1 | 100B | 110B | INPUT | 10:00 | 10:30 | 10.0 | 0.0 | NORMAL |
| MT2 | 100B | 120B | INPUT | 10:00 | 10:30 | 1.0 | 0.0 | Master |
| MT3 | 100B | 140B | OUTPUT | 10:00 | 10:30 | 10.0 | 0.0 | NORMAL |
| MT4 | 200B | 210B | INPUT | 10:00 | 10:30 | 9.0 | 0.0 | NORMAL |
| MT5 | 200B | 220B | INPUT | 10:00 | 10:30 | 2.0 | 0.0 | Master |
| MT6 | 200B | 230B | OUTPUT | 10:00 | 10:30 | 10.0 | 0.0 | NORMAL |

Fig. 31

| INPUT/OUTPUT TERMINAL ID | BREAKDOWN POWER (kWh) | POWER TRANSMISSION SOURCE (BREAKDOWN) | MEASUREMENT TAG TO BE REFERRED | POWER TAG TO BE GENERATED |
|---|---|---|---|---|
| 110B | 10.0 | SOLAR POWER GENERATION | MT1 | PT1 |
| 120B | 1.0 | Master | MT2 | PT2 |
| 220B | 2.0 | Master | MT5 | PT7 |

Fig. 33

| | TARGET OUTPUT TERMINAL | INPUT TERMINAL OF NEXT HOP ROUTER | POWER TRANSMISSION SOURCE | BREAKDOWN CALCULATION FORMULA | BREAKDOWN RATIO | BREAKDOWN POWER (kWh) | MEASUREMENT TAG TO BE REFERRED | POWER TAG TO BE GENERATED |
|---|---|---|---|---|---|---|---|---|
| S44 | 140B | — | 110B | 10 / (10 + 1) * 10 | 91% | 9.1 | MT1, MT3 | PT3 |
| | | | 120B (Master) | 1 / (10 + 1) * 10 | 9% | 0.9 | MT2, MT3 | PT4 |
| S45 | — | 210B | 110B | 9.1 / 10 * 9 | 91% | 8.2 | MT3, MT4 | PT5 |
| | | | 120B (Master) | 0.9 / 10 * 9 | 9% | 0.8 | MT3, MT4 | PT6 |
| S44 | 230B | | 110B | 8.2 / (9 + 2) * 10 | 75% | 7.5 | MT4, MT6 | PT8 |
| | | | 120B (Master) | 0.8 / (9 + 2) * 10 | 7% | 0.7 | MT4, MT6 | PT9 |
| | | | 220B (Master) | 2.0 / (9 + 2) * 10 | 18% | 1.8 | MT5, MT6 | PT10 |

| POWER TAG ID | POWER ROUTER ID | INPUT/OUTPUT TERMINAL ID | INPUT/OUTPUT | DATE | TIME PERIOD | ACTIVE POWER (kWh) | REACTIVE POWER (kvarh) | status | CONTRACT ID | PRICE (YEN/kWh) | CO2 EMISSION COEFFICIENT (g/kWh) | POWER GENERATION ORIGIN |
|---|---|---|---|---|---|---|---|---|---|---|---|---|
| PT1 | 100B | 110B | INPUT | 20121114 | 10:00-10:30 | 10.0 | 0.0 | NORMAL | C3 | 25.5 | 60.0 | SOLAR POWER |
| PT2 | 100B | 120B | INPUT | 20121114 | 10:00-10:30 | 1.0 | 0.0 | Master | - | - | - | - |
| PT3 | 100B | 140B | OUTPUT | 20121114 | 10:00-10:30 | 9.1 | 0.0 | NORMAL | C3 | 25.5 | 60.0 | SOLAR POWER |
| PT4 | 100B | 140B | OUTPUT | 20121114 | 10:00-10:30 | 0.9 | 0.0 | Master | - | - | - | - |
| PT5 | 200B | 210B | INPUT | 20121114 | 10:00-10:30 | 8.2 | 0.0 | NORMAL | C3 | 25.5 | 60.0 | SOLAR POWER |
| PT6 | 200B | 210B | INPUT | 20121114 | 10:00-10:30 | 0.8 | 0.0 | Master | - | - | - | - |
| PT7 | 200B | 220B | INPUT | 20121114 | 10:00-10:30 | 2.0 | 0.0 | Master | - | - | - | - |
| PT8 | 200B | 230B | OUTPUT | 20121114 | 10:00-10:30 | 7.5 | 0.0 | NORMAL | C3 | 25.5 | 60.0 | SOLAR POWER |
| PT9 | 200B | 230B | OUTPUT | 20121114 | 10:00-10:30 | 0.7 | 0.0 | Master | - | - | - | - |
| PT10 | 200B | 230B | OUTPUT | 20121114 | 10:00-10:30 | 1.8 | 0.0 | Master | - | - | - | - |

POWER NETWORK SYSTEM, POWER IDENTIFICATION METHOD, AND POWER ROUTER

CROSS-REFERENCE TO RELATED APPLICATIONS

This application is a national stage application of International Application No. PCT/JP2013/007251 entitled "ELECTRIC POWER NETWORK SYSTEM, ELECTRIC POWER IDENTIFICATION METHOD, AND ELECTRIC POWER ROUTER," filed on Dec. 10, 2013, which claims the benefit of the priority of Japanese Patent Application No. 2013-012197, filed on Jan. 25, 2013, the disclosures of each of which are hereby incorporated by reference in their entirety.

TECHNICAL FIELD

The present invention relates to an electric power network system, an electric power identification method, and an electric power router. In particular, the present invention relates to an electric power (hereinafter simply called "power") network system, a power identification method, and a power router for recognizing a breakdown of power output from a plurality of power supply sources (i.e., identifying each of a plurality of power supply sources).

BACKGROUND ART

When a power supply system is constructed, important challenges are not only to safely expand a power transmission network but also to construct the system so that a large quantity of natural energy can be introduced into the system in the future. Therefore, as a new power network, a power network system called "digital grid" (registered trademark) has been proposed (Patent Literature 1: U.S. Pat. No. 4,783,453, Non-Patent Literature 1: see the web site of The Digital Grid Consortium, http://www.digitalgrid.org/index.php/jp/). The digital grid (registered trademark) is a power network system in which a power network is sub-divided into small cells and these cells are connected with each other in an asynchronous manner. The size of each power cell ranges from a smaller one such as a cell corresponding to one house, one building, or one commercial facility to a larger one such as a cell corresponding to one prefecture or one municipality. Each power cell includes loads and, in some cases, a generator facility and/or a power storage facility. Examples of the generator facility include generator facilities using natural energy such as a solar generator, an aerogenerator, and a geothermal power plant.

Power cells are connected with each other in an asynchronous manner so that electricity can be generated inside a cell without restraint and power is flexibly supplied and received (hereinafter called "interchanged") between power cells. (That is, although a plurality of power cells are connected to each other, the voltage, the phase, and the frequency of the power used in each power cell are asynchronous to (i.e., different from) each other.)

FIG. 36 shows an example of a power network system 10. In FIG. 36, a core system 11 transmits backbone power from a large-scale power plant 12. Further, a plurality of power cells 21 to 24 are disposed. The power cells 21 to 24 include loads such as houses 31 and buildings 32, generator facilities 33 and 34, and power storage facilities 35. Examples of the generator facilities include a solar generator panel 33 and a wind turbine 34. The power storage facility is, for example, a storage battery 35. In the specification of the present application, generator facilities and power storage facilities are also collectively referred to as "distributed power supplies".

Further, the power cells 21 to 24 include their respective power routers 41 to 44 each of which serves as a connection inlet/outlet (connection port) for connection to other power cells and/or the core system 11. Each of the power routers 41 to 44 includes a plurality of legs (LEGs). (Because of the width of the paper, the symbols of the legs are omitted in FIG. 36. White circles in the power routers 41 to 44 represent the connection terminals of their legs.)

Note that each leg includes a connection terminal(s) and a power conversion unit(s), and has an address assigned thereto. Note that the power conversion by a leg means a conversion from an AC (Alternating Current) into a DC (Direct Current), a conversion from a DC to an AC, or a change in the voltage, the frequency, or the phase.

All the power routers 41 to 44 are connected to a management server 50 through a communication network 51, and managed and controlled by the management server 50 in a unified manner. For example, the management server 50 provides an instruction for power transmission or power reception performed by each leg to the power routers 41 to 44 by using the address assigned to each leg. In this way, a power interchange between power cells is performed through the power routers 41 to 44.

By enabling a power interchange to be performed between power cells, it is possible, for example, to enable a plurality of power cells to use one common generator facility 33 or 34 and/or one common power storage facility 35. If surplus power is reciprocally interchanged between power cells, it is possible to stably maintain the power supply/demand balance while considerably reducing the facility costs.

Further, Patent Literature 2 discloses a technique related to a power management system for associating the supply source of power with its consumer. In the power management system according to Patent Literature 2: an energy (i.e., electric energy) is measured for each of categories such as an AC apparatus, a solar battery, a fuel cell, a storage battery, and a DC apparatus; power attribute records, which are a group of information pieces corresponding to and associated with the measured power, are generated; and power that is supplied from each power supply system of commercial power supply and power that is output thereto are managed based on the power attribute records. In particular, each power attribute record holds information indicating which generator facility the electricity is generated by.

CITATION LIST

Patent Literature

Patent Literature 1: Japanese Patent No. 4783453
Patent Literature 2: Japanese Unexamined Patent Application Publication No. 2011-83085

Non Patent Literature

Non-patent Literature 1: The Digital Grid Consortium, [Searched on Nov. 28, 2012], the Internet <URL: http://www.digitalgrid.org/index.php/jp/>

SUMMARY OF INVENTION

Technical Problem

If a plurality of power cells can be connected by their power routers in an asynchronous manner, this is significantly advantageous. Therefore, it has been desired to commercially implement power routers as soon as possible.

Incidentally, in Patent Literature 2, power is independently received for each generator facility, i.e., for each power supply source. Therefore, it is easy to identify the supply source of received power. However, when power in which outputs of a plurality of power supply sources are mixed is received, it is impossible to identify, among all the received power outputs, power originating from each power supply source. When a power network system like the one disclosed in Patent Literature 1 is commercially implemented in the future, a situation in which outputs of a plurality of power supply sources are mixed and the mixed power is received could occur. Therefore, it is necessary to recognize a breakdown of power supply sources (i.e., identify each of power supply sources) for received power.

The present invention has been made to solve the above-described problem and an object thereof is to provide a power network system, a power identification method, and a power router for recognizing a breakdown of power supply sources (i.e., identifying each of power supply sources) even when power output from a plurality of power supply sources is mixed and received in the mixed state.

Solution to Problem

A power network system according to a first aspect of the present invention includes: a plurality of power cells each including a power router for an asynchronous connection with an external power system, in which
the power router includes:
a DC bus maintained at a predetermined rated voltage;
a plurality of input/output terminal parts, one connection end of each of the input/output terminal parts being connected to the DC bus, the other connection end of each of the input/output terminal parts being connected to an external entity to be connected as an external connection terminal, each of the input/output terminal parts being configured to convert power between the one connection end and the other connection end; and
a control unit that controls the plurality of input/output terminal parts,
at least a plurality of power routers are connected through respective input/output terminal parts in a multi-stage configuration,
in a state where: one input/output terminal part in one power router among the plurality of power routers is a first power transmission source; one input/output terminal part in another power router is a power transmission destination; and an input/output terminal part different from the first power transmission source and the power transmission destination is a second power transmission source, when a predetermined amount of power is transmitted to the power transmission destination by mixing power from the first power transmission source with power from the second power transmission source,
the power network system includes as power information about power received in the power transmission destination:
identification information of the first power transmission source; and
an intermediate measurement value, the intermediate measurement value being a measurement value of power received in an intermediate input/output terminal part, the intermediate input/output terminal part being an input/output terminal part in a power router located on a power transmission route of the predetermined amount of power, the intermediate input/output terminal part receiving the power that is transmitted from the first power transmission source but has not yet been mixed with the power transmitted from the second power transmission source.

A power identification method according to a second aspect of the present invention uses: a plurality of power routers including: a DC bus maintained at a predetermined rated voltage; a plurality of input/output terminal parts, one connection end of each of the input/output terminal parts being connected to the DC bus, the other connection end of each of the input/output terminal parts being connected to an external entity to be connected as an external connection terminal, each of the input/output terminal parts being configured to convert power between the one connection end and the other connection end; and a control unit that controls the plurality of input/output terminal parts; and a central control device connected to the plurality of power routers through a network, in which
at least a plurality of power routers are connected through respective input/output terminal parts in a multi-stage configuration,
the central control device defines a connection relation of each input/output terminal part and sets a power transmission route so that: one input/output terminal part in one power router among the plurality of power routers becomes a first power transmission source; one input/output terminal part in another power router becomes a power transmission destination; and an input/output terminal part different from the first power transmission source and the power transmission destination becomes a second power transmission source, in order to mix power from the first power transmission source with power from the second power transmission source and thereby transmit a predetermined amount of power to the power transmission destination,
an intermediate input/output terminal part measures its received power as an intermediate measurement value, the intermediate input/output terminal part being an input/output terminal part in a power router located on a power transmission route of the predetermined amount of power, the intermediate input/output terminal part receiving the power that is transmitted from the first power transmission source but has not yet been mixed with the power transmitted from the second power transmission source,
the intermediate input/output terminal part transmits the intermediate measurement value to the central control device by the control unit,
the central control device identifies the first power transmission source based on the power transmission route, and
the central control device generates power information including the intermediate measurement value and identification information of the identified first power transmission source.

A power network system according to a third aspect of the present invention includes: a plurality of power cells each including a power router for an asynchronous connection with an external power system, in which
the power router includes:
a DC bus maintained at a predetermined rated voltage;
a plurality of input/output terminal parts, one connection end of each of the input/output terminal parts being connected to the DC bus, the other connection end of each of the input/output terminal parts being connected to an external entity to be connected as an external connection terminal, each of the input/output terminal parts being configured to convert power between the one connection end and the other connection end; and a control unit that controls the plurality of input/output terminal parts, at least a plurality of power routers are connected through respective input/output terminal parts in a multi-stage configuration, in a state where: one input/output terminal part in one power router among the plurality of power routers is a first power transmission source; and one input/output terminal part in another power router is a power transmission destination, when a predetermined amount of power is transmitted from the first power transmission source to the power transmission destination, the power network system includes as power information about power received in the power transmission destination:

identification information of the first power transmission source; and an intermediate measurement value, the intermediate measurement value being a measurement value of power received in an intermediate input/output terminal part, the intermediate input/output terminal part being an input/output terminal part in a power router located on a power transmission route of the predetermined amount of power and being different from the first power transmission source and the power transmission destination.

A power router according to a fourth aspect of the present invention connects a power cell with an external power system in an asynchronous manner, including: a DC bus maintained at a predetermined rated voltage; a plurality of input/output terminal parts, one connection end of each of the input/output terminal parts being connected to the DC bus, the other connection end of each of the input/output terminal parts being connected to an external entity to be connected as an external connection terminal, each of the input/output terminal parts being configured to convert power between the one connection end and the other connection end; and a control unit that controls the plurality of input/output terminal parts, in which one input/output terminal part in another power router connected to the power router becomes a first power transmission source; one of the plurality of input/output terminal parts becomes a second power transmission source; another one of the plurality of input/output terminal parts becomes a power transmission destination; an input/output terminal part that is different from the second power transmission source and the power transmission destination and receives power from the first power transmission source becomes a first input/output terminal part, a predetermined amount of power is transmitted to the input/output terminal of the power transmission destination through the first input/output terminal part, the input/output terminal part of the second power transmission source, and the DC bus, the power router includes as power information about power in the input/output terminal of the power transmission destination: identification information of the first power transmission source; and an intermediate measurement value, the intermediate measurement value being a measurement value of power received in the first input/output terminal part in a predetermined time period.

Advantageous Effects of Invention

According to the present invention, it is possible to provide a power network system, a power identification method, and a power router for recognizing a breakdown of power supply sources (i.e., identifying each of power supply sources) even when power output from a plurality of power supply sources is mixed and received in the mixed state.

BRIEF DESCRIPTION OF DRAWINGS

FIG. 10 shows a summary of combination patters of connections between power routers;

FIG. 15 shows an example of an input/output terminal setting management table according to the first exemplary embodiment of the present invention;

FIG. 16 shows an example of power transmission route information according to the first exemplary embodiment of the present invention;

FIG. 17 shows an example of measurement tags according to the first exemplary embodiment of the present invention;

FIG. 18 shows an example of power tags according to the first exemplary embodiment of the present invention;

FIG. 27 shows an example of a power transmission/reception transaction contract information management table according to the second exemplary embodiment of the present invention;

FIG. 28 shows an example of an input/output terminal setting management table according to the second exemplary embodiment of the present invention;

FIG. 29 shows an example of a correspondence table between power transmission/reception contract information and an input/output terminal setting according to the second exemplary embodiment of the present invention;

FIG. 30 shows an example of power transmission route information according to the second exemplary embodiment of the present invention;

FIG. 31 shows an example of measurement tags according to the second exemplary embodiment of the present invention;

FIG. 33 shows an example of breakdown information according to the second exemplary embodiment of the present invention;

FIG. 34 shows a calculation example of breakdown information according to the second exemplary embodiment of the present invention;

FIG. 35 shows an example of power tags according to the second exemplary embodiment of the present invention.

DESCRIPTION OF EMBODIMENTS

Specific exemplary embodiments to which the present invention is applied are explained hereinafter in detail with reference to the drawings. The same components are denoted by the same symbols throughout the drawings, and duplicated explanation is omitted as necessary for clarifying the explanation.

Firstly, a configuration of a power router that is in common in exemplary embodiments according to the present invention is explained.

Figure 1:
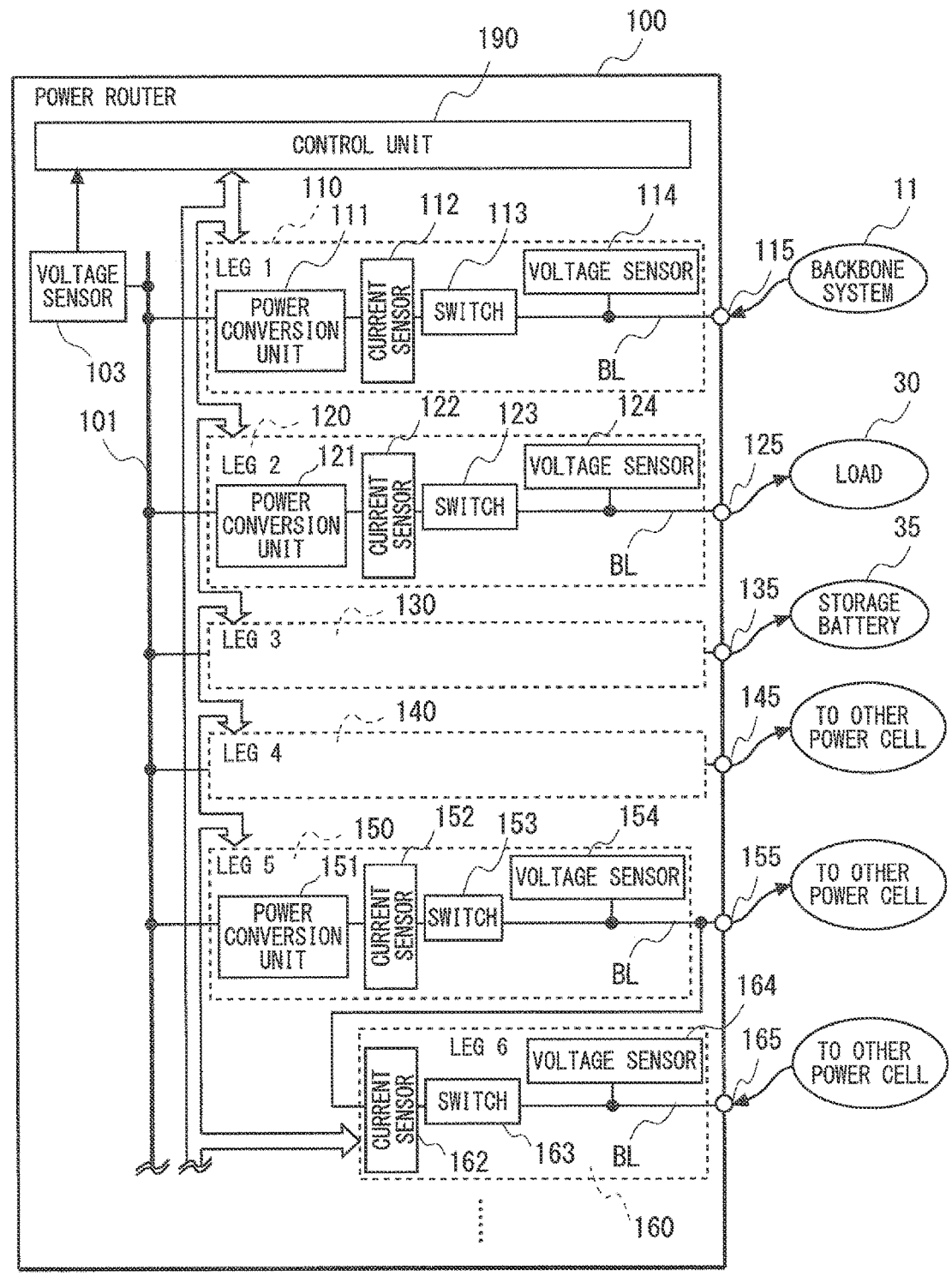
FIG. 1 is a block diagram showing a schematic configuration of a power router according to each exemplary embodiment of the present invention.

FIG. 1 shows a schematic configuration of a power router 100.

Figure 2:
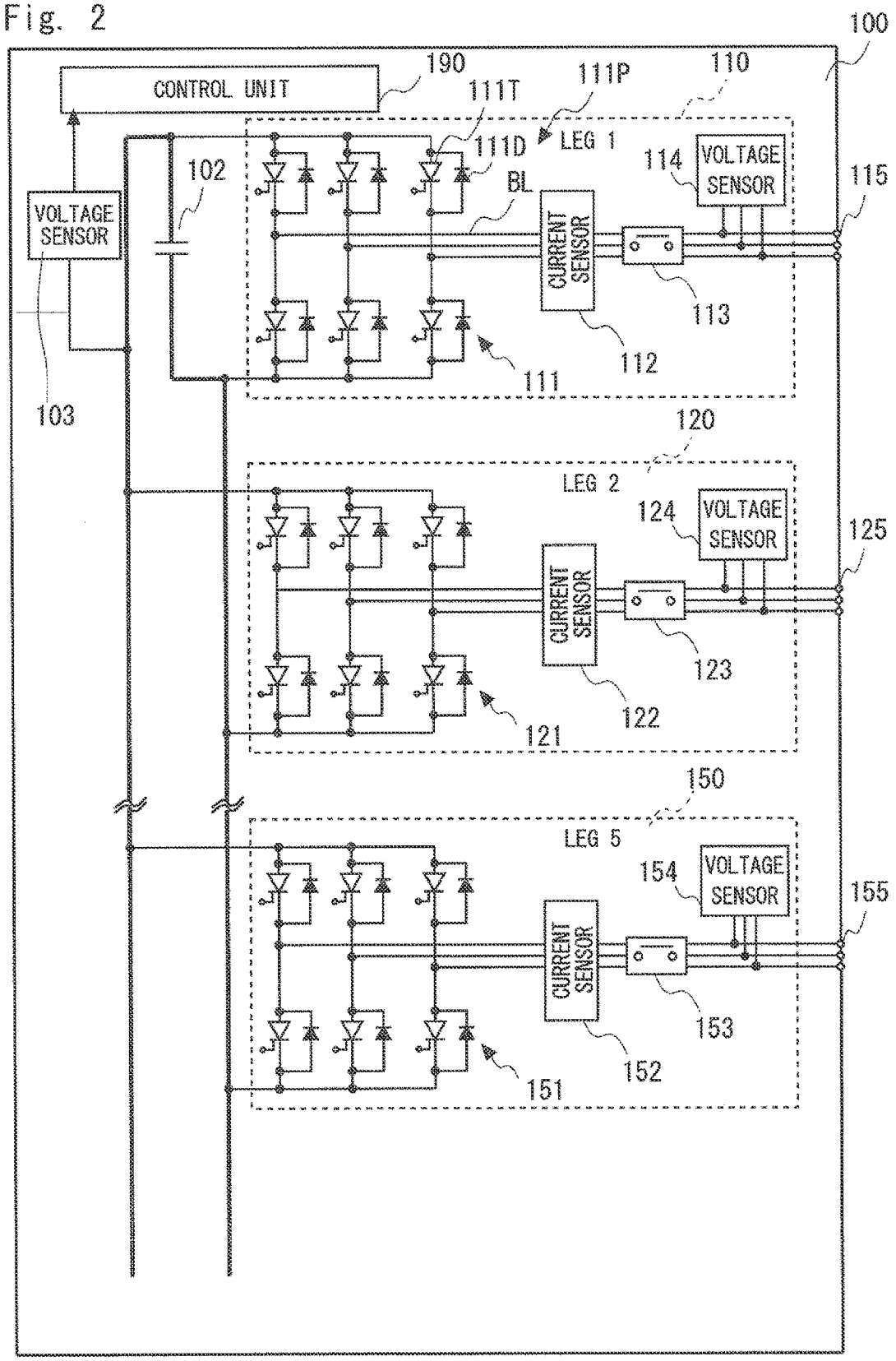
FIG. 2 is a block diagram showing details of an internal configuration of a power router according to each exemplary embodiment of the present invention.

Further, FIG. 2 shows an internal configuration of the power router 100 in a somewhat detailed manner.

Roughly speaking, the power router 100 includes a DC (Direct Current) bus 101, a plurality of legs 110 to 150, and a control unit 190.

The power router 100 includes the DC bus 101 and the plurality of legs 110 to 150 are connected in parallel with each other to this DC bus 101. The DC bus 101 is for feeding DC power and is controlled so that the voltage of the DC bus 101 is maintained at a predetermined value.

(How the voltage of the DC bus 101 is maintained at a constant voltage will be described later.)

The power router 100 is connected to external entities (such as external devices) through the legs 110 to 150. It should be noted that all the power that is exchanged with external entities are temporarily converted into DC power and the converted DC power is fed to the DC bus 101. By temporarily converting the power into DC power as described above, differences in the frequency, the voltage, and the phase become irrelevant (i.e., are eliminated), thus enabling the power cells to be connected with each other in an asynchronous manner. In this example, the DC bus 101 is a parallel-type bus with a smoothing capacitor 102 as shown in FIG. 2. A voltage sensor 103 is connected to the DC bus 101. A voltage value of the DC bus 101 detected by this voltage sensor 103 is sent to the control unit 190.

Next, the legs 110 to 150 are explained. The plurality of legs 110 to 150 are disposed in parallel with each other with respect to the DC bus. In FIG. 1, five legs 110 to 150 are shown. The five legs 110 to 150 are referred to as "first leg 110", "second leg 112", . . . , and "fifth leg 150" as shown in FIG. 1. Note that in FIG. 1, because of the width of the paper, the first leg 110 is shown as "leg 1"; the second leg 120 is shown as "leg 2"; and so on. Further, the illustration of the third and fourth legs 130 and 140 is omitted in FIG. 2.

Configurations of the first to fifth legs 110 to 150 are explained. Since the first to fifth legs 110 to 150 have identical configurations to each other, the configuration of the first leg 110 is explained as a representative configuration. The first leg 110 includes a power conversion unit 111, a current sensor 112, a switch 113, a voltage sensor 114, and connection terminals 115. The power conversion unit 111 converts AC power into DC power, or converts DC power into AC power. Since a DC voltage is flowing in the DC bus 101, the power conversion unit 111 converts the DC power in the DC bus 101 into AC power having a specified frequency and a specified voltage and feeds the obtained AC power to external entities (such as external devices) through the connection terminals 115. Alternatively, the power conversion unit 111 converts AC power fed through the connection terminals 115 into DC power and feeds the obtained DC power to the DC bus 101.

The power conversion unit 111 has a configuration equivalent to an inverter circuit. That is, in the power conversion unit 111, reverse-parallel circuits 111P each of which consists of a thyristor 111T and a feedback diode 111D are connected in a three-phase bridge configuration. (That is, six reverse-parallel circuits 111P are formed for one inverter circuit.)

Although a three-phase inverter circuit is used in this example since the three-phase AC is used, a single-phase inverter circuit may be used depending on circumstances. A line that is lead from a node between two reverse-parallel circuits 111P and connects that node with a connection terminal is referred to as "branch line BL". (Since the three-phase AC is used, one leg includes three branch lines BL.)

The direction of the power, the frequency of the AC power, and so on are controlled by the control unit 190. That is, the switching of the thyristors 111T is controlled by the control unit 190. The operation control performed by the control unit 190 will be described later.

The switch 113 is disposed between the power conversion unit 111 and the connection terminals 115. The branch lines BL are opened/closed by this switch 113. That is, the DC bus 101 is disconnected from or connected to an external entity (such as an external device) by the switch 113. Further, the voltage of the branch lines BL is detected by the voltage sensor 114 and the current flowing through the branch lines BL is detected by the current sensor 112. The open/close operation of the switch 113 is controlled by the control unit 190. Further, detection values detected by the voltage sensor 114 and the current sensor 112 are output to the control unit 190.

In the above explanation, the power conversion unit is formed by inverter circuits and external entities connected to the legs use AC power. However, in some cases, the external entities connected to the legs may be entities that use DC power such as a storage battery 35. (For example, the third leg 130 in FIG. 1 is connected to a storage battery 35.)

In this case, the power conversion is a DC-DC conversion. Therefore, an inverter circuit and a converter circuit may be provided in parallel with each other in the power conversion unit, and the inverter circuit or the converter circuit may be used according to whether the connected entity is an AC entity (such as an AC device) or a DC entity (such as a DC device). Alternatively, a leg(s) dedicated for a DC-DC conversion whose power conversion unit is a DC-DC conversion unit may be provided. Constructing a power router including both a leg(s) dedicated for an AC-DC conversion and a leg(s) dedicated for DC-DC conversion may be more advantageous than constructing a power router in which an inverter circuit an a converter circuit are provided in parallel with each other in every leg in view of many aspects such as the size and the cost.

The configuration of each of the first to fifth legs 110 to 150 is as described above.

(Operating Mode of Leg)

As previously described, the first to fifth legs 110 to 150 include the power conversion units 111 to 151, respectively, and the switching operations of the thyristors in the power conversion units are controlled by the control unit 190.

Note that the power router 100 is disposed in a node of the power network 10 and has an important role of connecting the core system 11, loads 30, distributed power supplies, power cells, and so on with each other. It should be noted that the connection terminals 115 to 155 of the respective legs 110 to 150 are connected to the core system 11, loads 30, distributed power supplies, or the power routers of other power cells. The inventors of the present application have found that the roles of the legs 110 to 150 are changed according to the entities to be connected thereto and hence the power routers do not work properly unless the legs 110 to 150 perform appropriate operations according to those roles. The inventors of the present application have configured the power network system so that the ways of the operations of the legs are changed according to the entities to be connected thereto, though the configurations of the legs are identical to each other.

The way of the operation of a leg is referred to as "operating mode".

The inventors of the present application have prepared three types of operating modes for the legs and configured the power network system so that their operating modes are changed according to the entities to be connected thereto.

The operating modes for the legs include:
a master mode;
a stand-alone mode; and
a designated power transmission/reception mode.

These modes are explained hereinafter one by one.

(Master Mode)

The master mode is an operating mode for a case where the leg is connected to a stable power supply source such as a system and for maintaining the voltage of the DC bus 101. FIG. 1 shows an example in which the connection terminal 115 of the first leg 110 is connected to the core system 11. In the case of FIG. 1, the first leg 110 is operated and controlled in a master mode and is in charge of maintaining the voltage of the DC bus 101. A lot of other legs 120 to 150 are also connected to the DC bus 101. Power may flow into the DC bus 101 from some of the legs 120 to 150 and power may flow out from the DC bus 101 through other of the legs 120 to 150. When power flows out from the DC bus 101 and hence the voltage of the DC bus 101 is lowered from its rated voltage, the leg 110, which is in the master mode, makes up the deficiency due to the flowed-out power by using power supplied from the connected entity (the core system 11 in this example). On the other hand, when power flows into the DC bus 101 and hence the voltage of the DC bus 101 is raised from the rated voltage, the leg 110 makes the excess power due to the flowed-in power flow out to the connected entity (the core system 11 in this example). In this way, the first leg 110, which is in the master mode, maintains the voltage of the DC bus 101.

Therefore, at least one leg has to be operated in a master mode in one power router. If not, the voltage of the DC bus 101 cannot be maintained at a fixed voltage. Meanwhile, two or more legs may be simultaneously operated in a master mode in one power router. However, the number of legs operating in a master mode in one power router is preferably one.

Further, the leg in a master mode may be connected to an entity other than the core system, such as a distributed power supply equipped with a self-commutated inverter (including a storage battery). However, the leg in a master mode cannot be connected to a distributed power supply equipped with a externally commutated inverter.

In the following explanation, a leg operated in a master mode may be called "master leg".

Operation control of a master leg is explained.

A master leg is started up through the following procedure.

Firstly, the switch 113 is brought into an opened (cut-off) state. The connection terminal 115 is connected to an entity to be connected in this state. In this example, the entity to be connected is the core system 11.

The voltage of the connected system is measured by the voltage sensor 114, and the amplitude, the frequency, and the phase of the voltage of the connected system are obtained by using a PLL (Phase-Locked-Loop) or the like. After that, the output of the power conversion unit 111 is adjusted so that the power conversion unit 111 outputs a voltage having an amplitude, a frequency, and a phase equal to the obtained ones. That is, On/Off patterns of the thyristors 111T are determined. When this output is stabilized, the switch 113 is closed and hence the power conversion unit 111 is connected to the core system 11. At this point, since the voltage of the output of the power conversion unit 111 is synchronized with the voltage of the core system 11, no current flows therebetween.

Operation control for operating a master leg is explained. The voltage of the DC bus 101 is measured by the voltage sensor 103. If the voltage of the DC bus 101 is higher than a predetermined rated bus voltage, the power conversion unit 111 is controlled so that power is transmitted from the master leg 110 to the system. (At least one of the amplitude and the phase of the voltage output from the power conversion unit 111 is adjusted so that power is transmitted from the DC bus 101 to the core system 11 through the master leg 110.) Note that the rated voltage of the DC bus 101 is defined in advance by a setting.

On the other hand, if the voltage of the DC bus 101 is lower than the predetermined rated bus voltage, the power conversion unit 111 is controlled so that the master leg 110 receives power from the core system 11. (At least one of the amplitude and the phase of the voltage output from the power conversion unit 111 is adjusted so that power is transmitted from the core system 11 to the DC bus 101 through the master leg 110.) It can be understood that by performing the above-described operation of the master leg, the voltage of the DC bus 101 can be maintained at the predetermined rated voltage.

(Stand-Alone Mode)

The stand-alone mode is an operating mode in which a leg generates a voltage having an amplitude and/or a frequency specified by the management server 50 by itself and transmits/receives power to/from a connected entity.

For example, it is an operating mode for supplying power for an entity that consumes power such as a load 30. Alternatively, it is an operating mode for directly receiving power transmitted from a connected entity.

FIG. 1 shows an example in which the connection terminal 125 of the second leg 120 is connected to a load 30. The second leg 120 is operated and controlled in a stand-alone mode and supplies power to the load 30.

Further, when a leg is connected to another power router as in the case of the fourth and fifth legs 140 and 150, the leg, e.g., the fourth leg 140 or the fifth leg 150 may be operated in a stand-alone mode as a mode for transmitting an amount of power required from the another power router.

Alternatively, when a leg is connected to another power router as in the case of the fourth and fifth legs 140 and 150, the leg, e.g., the fourth leg 140 or the fifth leg 150 may be operated in a stand-alone mode as a mode for receiving power transmitted from the another power router.

Further, though it is not shown in the figure, when the second leg is connected to a generator facility instead of being connected to the load 30, the second leg can also be operated in a stand-alone mode. However, in this case, the generator facility needs to be equipped with a externally commutated inverter.

An operating mode that is used when power routers are connected with each other will be described later.

A leg that is operated in a stand-alone mode is referred to as "stand-alone leg". One power router may include a plurality of stand-alone legs.

Operation control of a stand-alone leg is explained.

Firstly, the switch 123 is brought into an opened (cut-off) state. The connection terminal 125 is connected to the load 30. The management server 50 instructs the power router 100 about the amplitude and the frequency of power (voltage) that should be supplied to the load 30. Therefore, the control unit 190 performs control so that power (voltage) having the specified amplitude and the frequency is output from the power conversion unit 121 to the load 30. (That is, On/Off patterns of the thyristors 121T are determined.) When this output is stabilized, the switch 123 is closed and hence the power conversion unit 121 is connected to the load 30. After that, when power is consumed in the load 30, power equivalent to that power flows from the stand-alone leg 120 to the load 30.

(Designated Power Transmission/Reception Mode)

The designated power transmission/reception mode is an operating mode for exchanging a designated amount of power. That is, there are a case where a designated amount of power is transmitted to a connected entity and a case where a designated amount of power is received from a connected entity.

In FIG. 1, the fourth and fifth legs 140 and 150 are connected to other power routers.

In cases like this, a determined amount of power may be supplied from one of the power routers to the other power router.

As an alternative example, the third leg 130 is connected to a storage battery 35.

In the cases like this, a determined amount of power is transmitted to the storage battery 35 and the storage battery 35 is thereby charged.

Alternatively, a designated power transmission/reception leg may be connected to a distributed power supply equipped with a self-commutated inverter (including a storage battery). However, a designated power transmission/reception leg cannot be connected to a distributed power supply equipped with a externally commutated inverter.

A leg that is operated in a designated power transmission/reception mode is referred to as "designated power transmission/reception leg". One power router may include a plurality of designated power transmission/reception legs.

Operation control of a designated power transmission/reception leg is explained. Control that is performed when the leg is started up is fundamentally the same as that for the master leg, and therefore the explanation thereof is omitted.

Operation control for operating a designated power transmission/reception leg is explained (For the explanation, symbols assigned to the fifth leg 150 are used.)

The voltage of the connected system is measured by the voltage sensor 154, and the frequency and/or the phase of the voltage of the connected system are obtained by using a PLL (Phase-Locked-Loop) or the like. A target value for a current input/output by the power conversion unit 151 is obtained (or calculated) based on an active power value and a reactive power value specified by the management server 50 and the frequency and the phase of the voltage of the connected entity. The present value (i.e., value at the present time) of the current is measured by the current sensor 152. The power conversion unit 151 is adjusted so that a current corresponding to a difference between the target value and the present value is additionally output. (At least one of the amplitude and the phase of the voltage output from the power conversion unit 151 is adjusted so that desired power flows between the designated power transmission/reception leg and the connected entity.)

From the above explanation, it can be understood that each of the first to fifth legs having identical configurations can perform three different functions by changing the way of the operation control thereof.

(Connection Restriction)

Since the function of a leg is changed based on its operating mode, a restriction(s) occurs between the choice of a connected entity and the choice of an operating mode as a matter of course. In other words, when the entity to be connected is determined, an operating mode(s) that the leg can select is determined. To put it the other way around, when the operating mode is determined, selectable entities to be connected are determined. (When the connected entity is changed, the operating mode of the leg needs to be changed according to the new connected entity.)

Possible connection combination patterns are explained.

Figure 3:
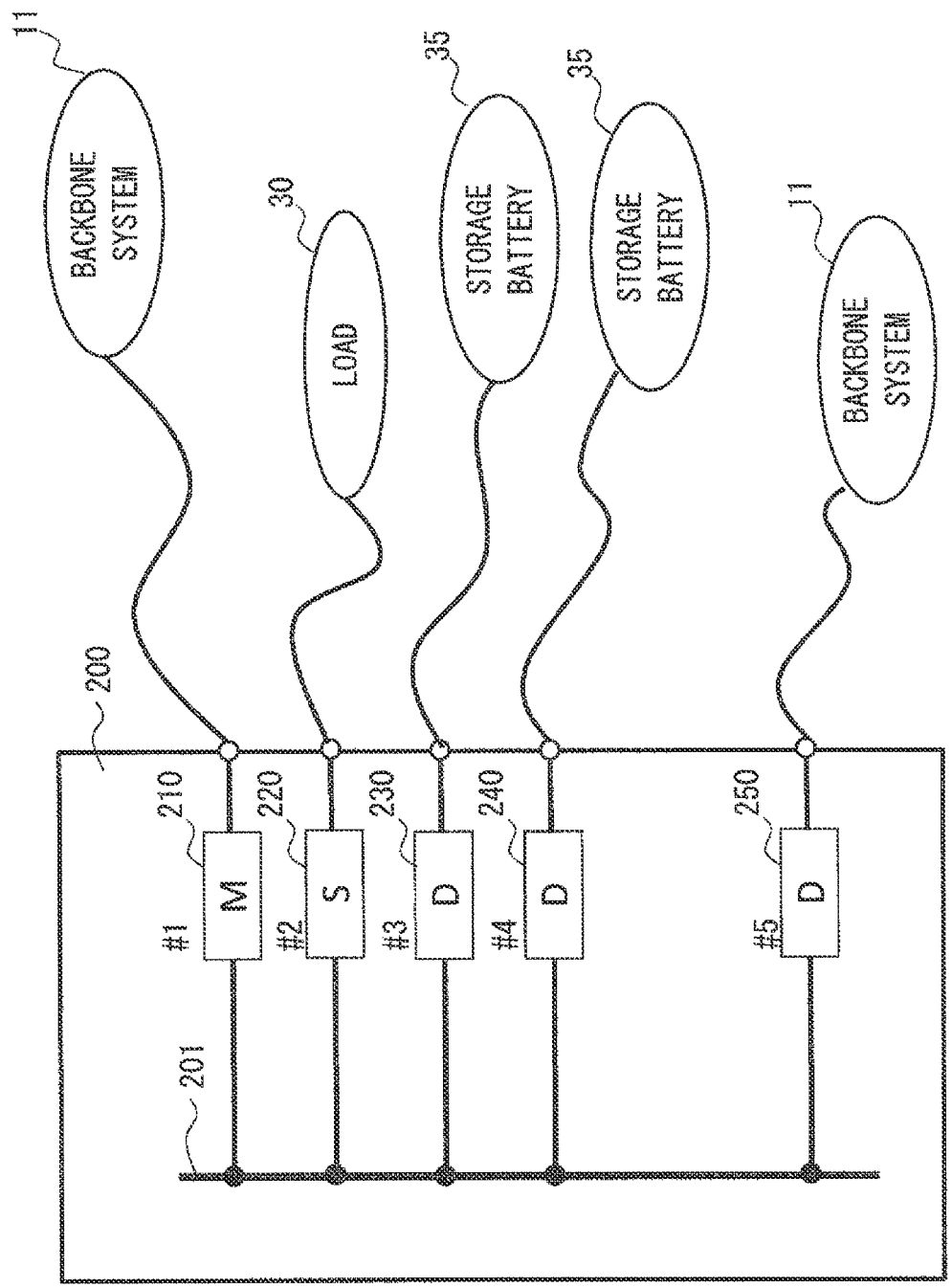
FIG. 3 shows an example in which a power router is connected with a core system, loads, and various distributed power supplies.

In the following explanation, expressions in the figures are simplified as shown in FIG. 3.

That is, a master leg is represented by "M".

A stand-alone leg is represented by "S".

A designated power transmission/reception leg is represented by "D".

Further, when necessary, legs may be distinguished from one another by adding numbers such as "#1" at the upper-left corners of legs.

Further, in FIG. 3 and the subsequent figures, symbols are assigned in an orderly manner in each figure. However, the same symbols are not necessarily assigned to the same components throughout the figures.

Figure 4:
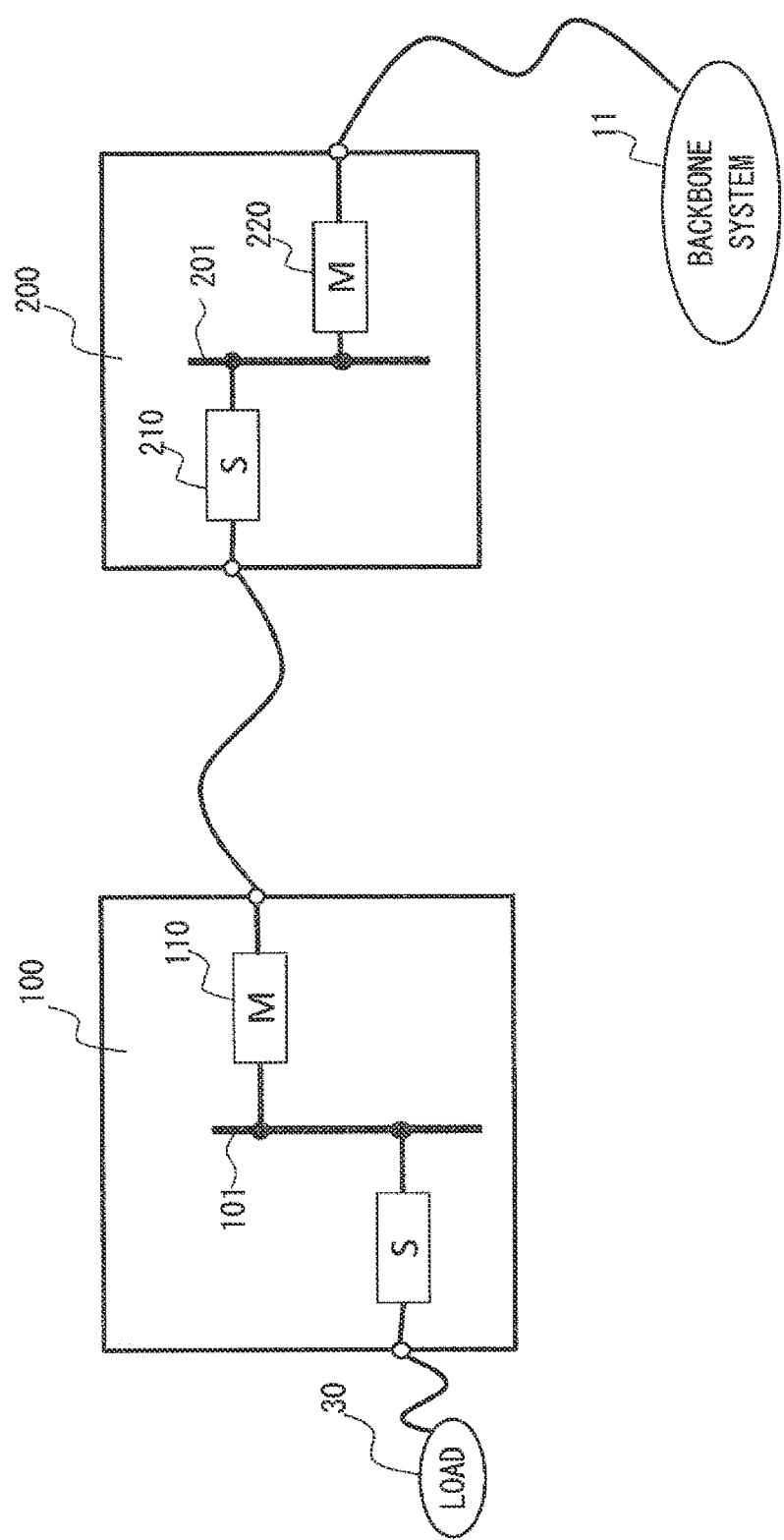
FIG. 4 shows an example of a possible combination of a connection between power routers.

For example, a symbol 200 in FIG. 3 does not necessarily represent the same component as the component assigned with a symbol 200 in FIG. 4.

The connection combinations shown in FIG. 3 are all possible connections. A first leg 210 is connected to a core system 11 as a master leg. This is already explained above.

A second leg 220 is connected to a load 30 as a stand-alone leg. This is also already explained above.

Third and fourth legs 230 and 240 are connected to a storage battery 35 as designated power transmission/reception legs. This is also already explained above.

A fifth leg 250 is connected to the core system 11 as a designated power transmission/reception leg. Assuming that a determined amount of power is received from the core system 11 through the fifth leg 250, it can be understood that this connection can be allowed.

Note that since the first leg 210 serves as the master leg, the master leg 210 receives necessary power from the core system 11 when the power received through the fifth leg 250 is not sufficient for maintaining the rated voltage of a DC bus 201. On the other hand, when the power received through the fifth leg 250 exceeds the amount of power necessary for maintaining the rated voltage of the DC bus 201, the master leg 210 makes the excess power flow out to the core system 11.

Next, a case where power routers are connected with each other is explained. Connecting power routers with each other means that a leg of one power router is connected to a leg of another power router. When legs are connected to each other, there is a restriction on operating modes that can be combined with each other.

Figure 5:
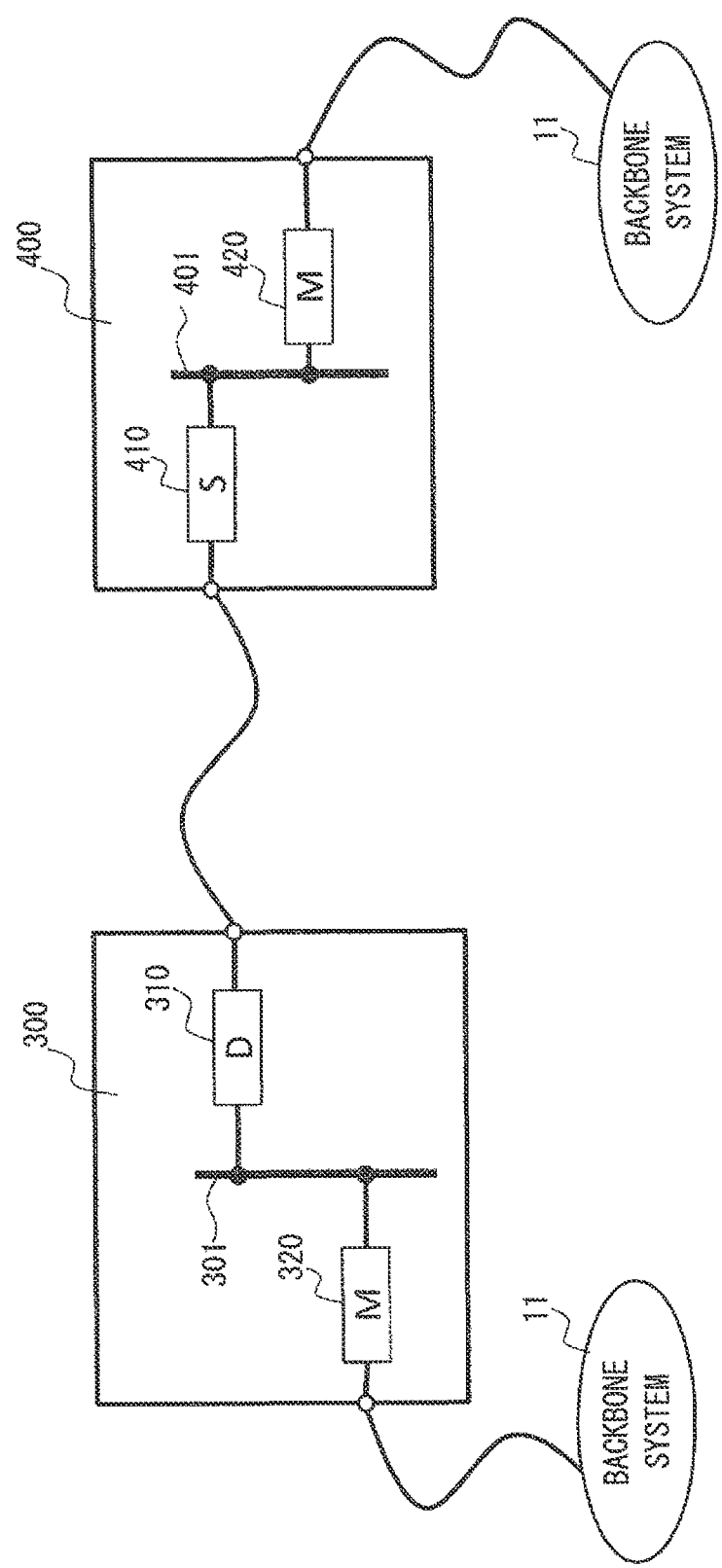
FIG. 5 shows an example of a possible combination of a connection between power routers.

Both of FIGS. 4 and 5 show examples of possible combinations. In FIG. 4, a master leg 110 of a first power router 100 is connected to a stand-alone leg 210 of a second power router 200. Though detailed explanations are omitted, it is assumed that a master leg 220 of the second power router 200 is connected to a core system 11 and the voltage of a DC bus 201 of the second power router 200 is thereby maintained at the rated voltage.

In FIG. 4, when power is supplied from the power router 100 to a load 30, the voltage of a DC bus 101 is lowered. The master leg 110 obtains power from the connected entity in order to maintain the voltage of the DC bus 101. That is, the master leg 110 draws power equivalent to the shortage from the stand-alone leg 210 of the second power router 200. The stand-alone leg 210 of the second power router 200 sends the amount of power required by the connected entity (the master leg 110 in this example). The voltage of the DC bus 201 of the second power router 200 is lowered by an amount corresponding to the power that has been sent out from the stand-alone leg 210. However, this deficiency is made up by the master leg 220 by using power from the core system 11. In this way, the power router 100 can receive a necessary amount of power from the second power router 200.

As described above, even when the master leg 110 of the power router 100 is connected to the stand-alone leg 210 of the second power router 200, any failure occurs in neither of their operations because the role of the master leg 110 is consistent with that of the stand-alone leg 210. Therefore, it can be understood that a master leg can be connected to a stand-alone leg as shown in FIG. 4.

In FIG. 5, a designated power transmission/reception leg 310 of a third power router 300 is connected to a stand-alone leg 410 of a fourth power router 400. Though detailed explanations are omitted, it is assumed that a master leg 320 of the third power router 300 and a master leg 420 of the fourth power router 400 are both connected to a core system 11 and the voltages of DC buses 301 and 402 of the third and fourth power routers 300 and 400, respectively, are thereby maintained at their rated voltages.

It is assumed that the designated power transmission/reception leg 310 of the third power router 300 is instructed to receive a designated amount of power under an instruction of the management server 50. The designated power transmission/reception leg 310 draws the designated amount of power from the stand-alone leg 410 of the fourth power router 400. The stand-alone leg 410 of the fourth power router 400 sends the amount of power required by the connected entity (the designated power transmission/reception leg 310 in this example). Although the voltage of the DC bus 401 of the fourth power router 400 is lowered by an amount corresponding to the power sent out from the stand-alone leg 410, this deficiency is made up by the master leg 420 by using power from the core system 11.

As described above, even when the designated power transmission/reception leg 310 of the third power router 300 is connected to the stand-alone leg 410 of the second power router 400, any failure occurs in neither of their operations because the role of the designated power transmission/reception leg 310 is consistent with that of the stand-alone leg 410. Therefore, it can be understood that a designated power transmission/reception leg can be connected to a stand-alone leg as shown in FIG. 5.

Note that although an example where the third power router 300 receives power from the fourth power router 400 is explained, it can be understood that even when the third power router 300 supplies power to the fourth power router 400 in contrast to the above-described example, any failure occurs in neither of their operations as in the case of the above-described example.

In this way, a designated amount of power can be interchanged between the third and fourth power routers 300 and 400.

When legs having power conversion units are directly connected to each other, only the two patterns shown in FIGS. 4 and 5 are allowed.

That is, only the case where a master leg is connected to a stand-alone leg and the case where a designated power transmission/reception leg is connected to a stand-alone leg are allowed.

Next, combinations of legs that cannot be connected to each other are shown.

FIGS. 6 to 9 show patterns of legs that cannot be connected to each other.

Figure 6:
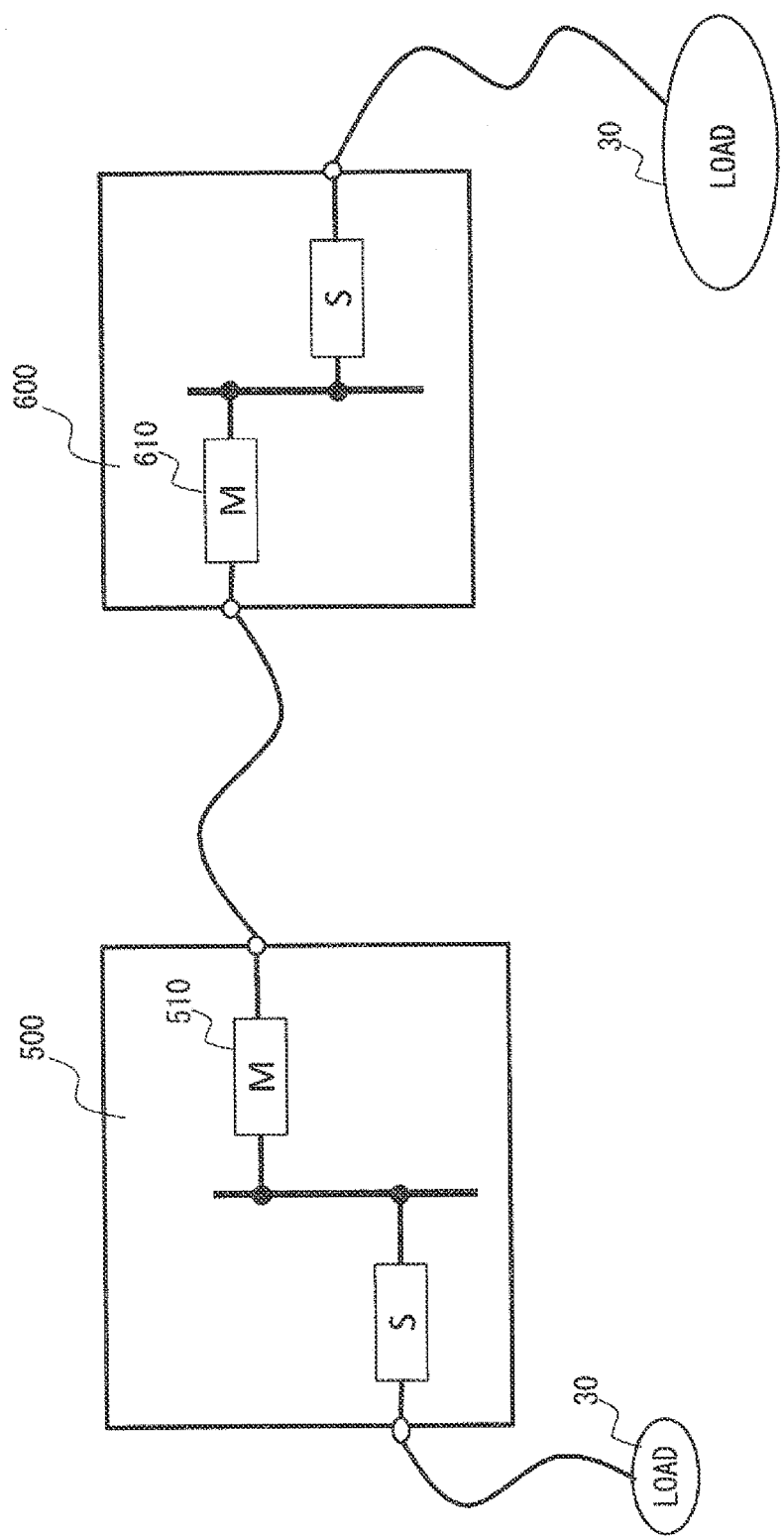
FIG. 6 shows an example of a prohibited combination of a connection between power routers.
Figure 7:
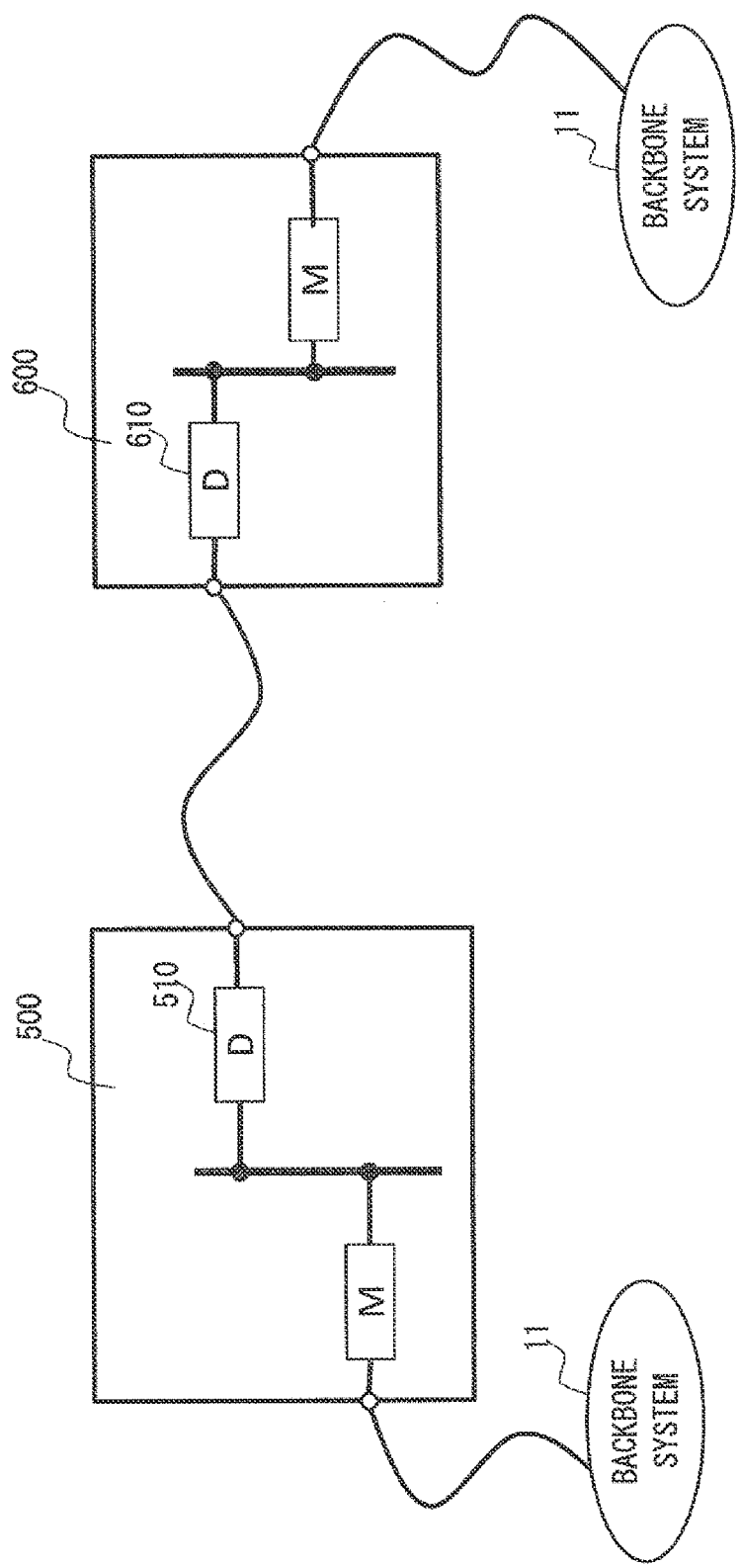
FIG. 7 shows an example of a prohibited combination of a connection between power routers.
Figure 8:
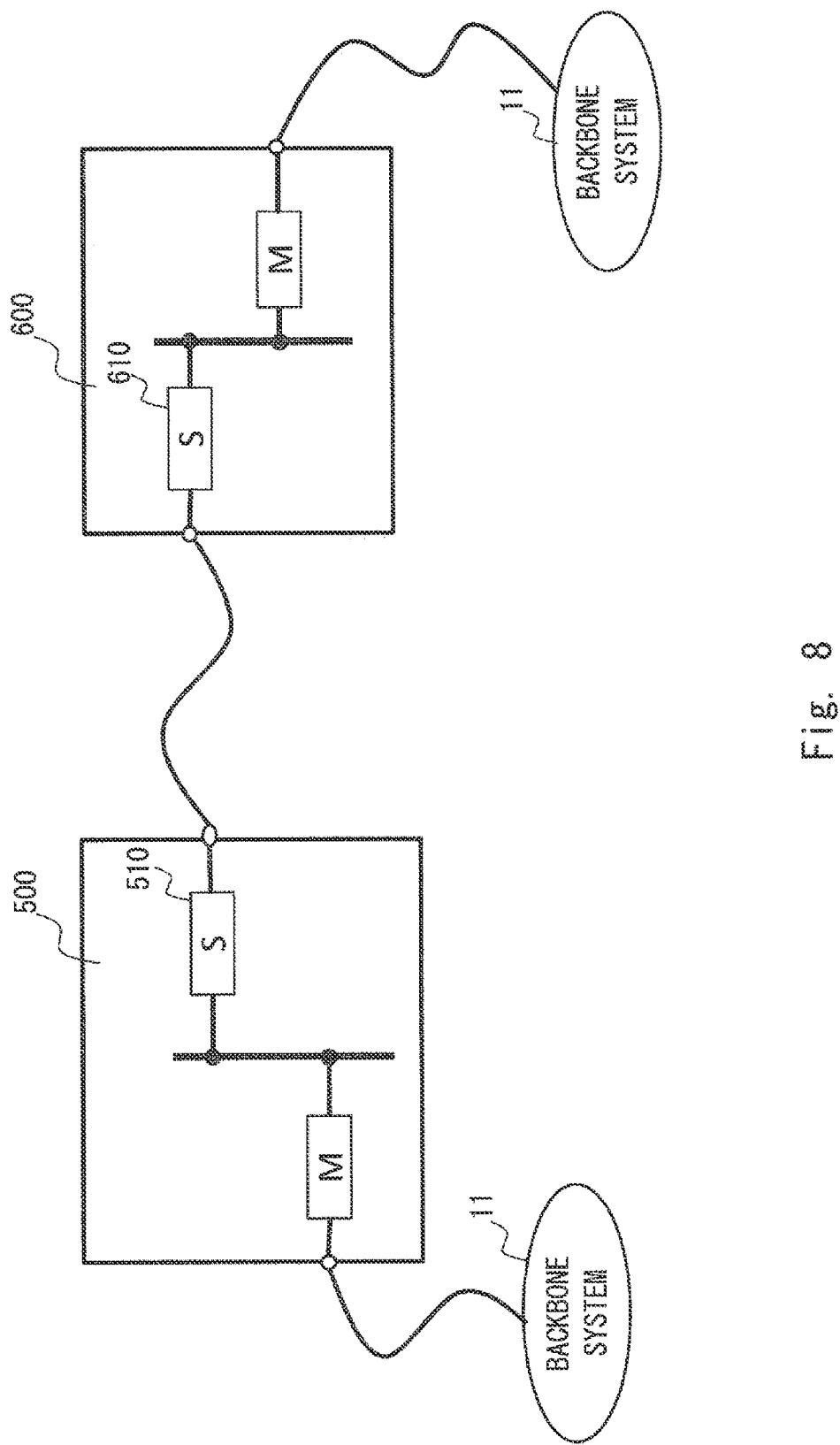
FIG. 8 shows an example of a prohibited combination of a connection between power routers.

As can be seen from FIGS. 6, 7 and 8, legs in the same operating modes cannot be connected to each other.

In the case of FIG. 6, for example, master legs are connected to each other.

As explained previously in the explanation of the operations, a master leg first performs a process of generating power whose voltage, frequency, and phase are synchronized with those of an entity to be connected thereto.

If the entity to be connected is also a master leg, they try to synchronize their voltages and frequencies with each other. However, since the master legs do not independently establish the voltages and the frequencies, these synchronization processes cannot succeed.

Therefore, master legs cannot be connected to each other.

In addition, there is the following reason.

A master leg has to draw power from a connected entity in order to maintain the voltage of its DC bus. (Alternatively, a master leg has to make excess power flow out to a connected entity in order to maintain the voltage of its DC bus.) If master legs are connected to each other, each of them cannot meet the requirement of the other connected entity. (If master legs are connected to each other, both of the power routers cannot maintain the voltages of their DC buses. As a result, a failure such as a power failure (or blackout) could occur in each of their power cells.) Since the roles of master legs contradict each other (are inconsistent with each other) as described above, master legs cannot be connected to each other.

In FIG. 7, designated power transmission/reception legs are connected to each other. It can be understood that this connection also does not work properly.

As in the case of the master legs and as explained previously in the explanation of the operations, a designated power transmission/reception leg first performs a process of generating power whose voltage, frequency, and phase are synchronized with those of an entity to be connected thereto.

If the entity to be connected is also a designated power transmission/reception leg, they try to synchronize their voltages and frequencies with each other. However, since the designated power transmission/reception legs do not independently establish the voltages and the frequencies, these synchronization processes cannot succeed.

Therefore, designated power transmission/reception legs cannot be connected to each other.

In addition, there is the following reason.

Even if designated power to be transmitted that one of the designated power transmission/reception legs, e.g., the designated power transmission/reception leg 510 should transmit is conformed to designated power to be received that the other designated power transmission/reception leg 610 should receive, these designated power transmission/reception legs cannot be connected to each other. For example, assume that the one designated power transmission/reception leg 510 tries to adjust its power conversion unit in order to transmit the designated power to be transmitted. (For example, it makes its output voltage higher than that of the connected entity by a predetermined amount.) Meanwhile, the other designated power transmission/reception leg 610 tries to adjust its power conversion unit in order to receive the designated power to be received. (For example, it makes its output voltage lower than that of the connected entity by a predetermined amount.) It can be understood that if the above-described adjustment operations are simultaneously performed in both of the designated power transmission/reception legs 510 and 610, both of them go out of control.

In FIG. 8, stand-alone legs are connected to each other. This connection is also prohibited.

A stand-alone leg generates a voltage and/or a frequency by itself.

If stand-alone legs are connected to each other and one of the voltages, the frequencies, and the phases generated by the two stand-alone legs are separated from each other even by a small amount, unintended power flows between these two stand-alone legs.

Since it is practically impossible to continuously conform the voltages, the frequencies, and the phases generated by the two stand-alone legs to each other, stand-alone legs cannot be connected to each other.

Figure 9:
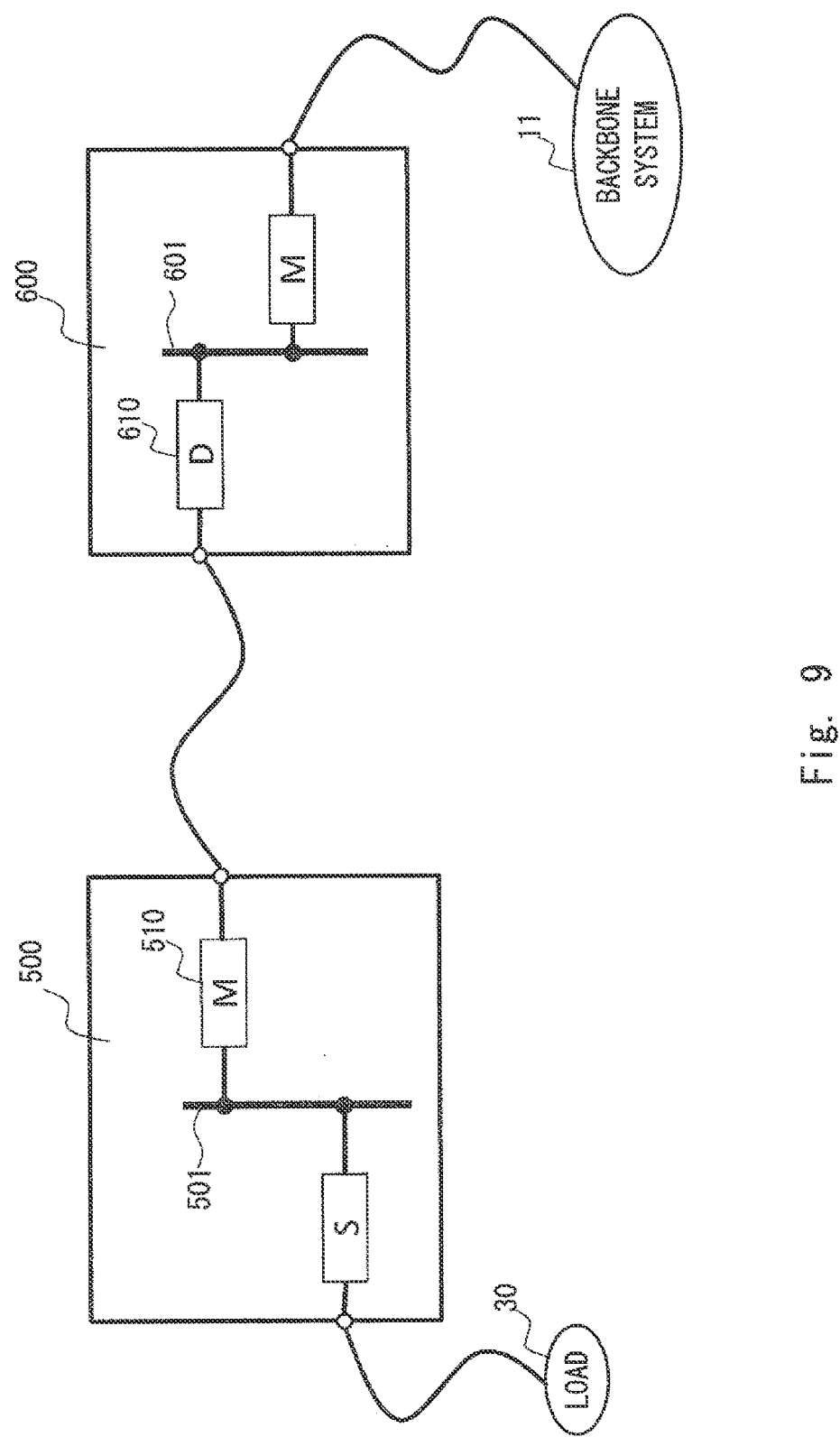
FIG. 9 shows an example of a prohibited combination of a connection between power routers.

In FIG. 9, a master leg is connected to a designated power transmission/reception leg.

It can be understood that this connection also does not work properly based on the above explanations. Even if the master leg 510 tries to transmit/receive power to/from the connected entity in order to maintain the voltage of a DC bus 501, the designated power transmission/reception leg 610 does not transmit/receive power to/from the master leg 510 according to the request from the master leg 510. Therefore, the master leg 510 cannot maintain the voltage of the DC bus 501. Further, even if the designated power transmission/reception leg 610 tries to transmit/receive a designated amount of power to/from the connected entity (510), the master leg 510 does not transmit/receive power to/from the designated power transmission/reception leg 610 according to the request from the designated power transmission/reception leg 610. Therefore, the designated power transmission/reception leg 610 cannot transmit/receive the designated amount of power to/from the connected entity (the master leg 510 in this example).

The matters that have been explained so far are summarized in FIG. 10.

As described above, in the power network system using the above-described power router 100 or the like, power supplied from a plurality of power supply sources can be mixed with each other through a DC bus disposed in each power router. Then, power can be output to a supply destination through a leg connected to the DC bus. Therefore, if received power is simply measured in the leg disposed in the power router through which the power is output to an external entity, the mixed power is measured. That is, it is impossible to recognize the ratio of power supplied from each power supply source based on the measurement value itself. Accordingly, a power network system, a power identification method, and a power router for recognizing a breakdown of power supply sources (i.e., identifying each of power supply sources) even when power output from a plurality of power supply sources is mixed and received in the mixed state are explained.

First Exemplary Embodiment of the Invention

In a first exemplary embodiment of the present invention, an example in which a breakdown of power is recognized (i.e., each of power supply source is identified) in a case where power supplied from a plurality of power systems is transmitted to one entity (such as one device) through a plurality of power routers is explained. Note that in the first exemplary embodiment of the present invention, losses in power that occur during the power transmission are ignored. Further, the above-described "leg" is called "input/output terminal" or "input/output terminal part" in the following explanation.

Figure 11:
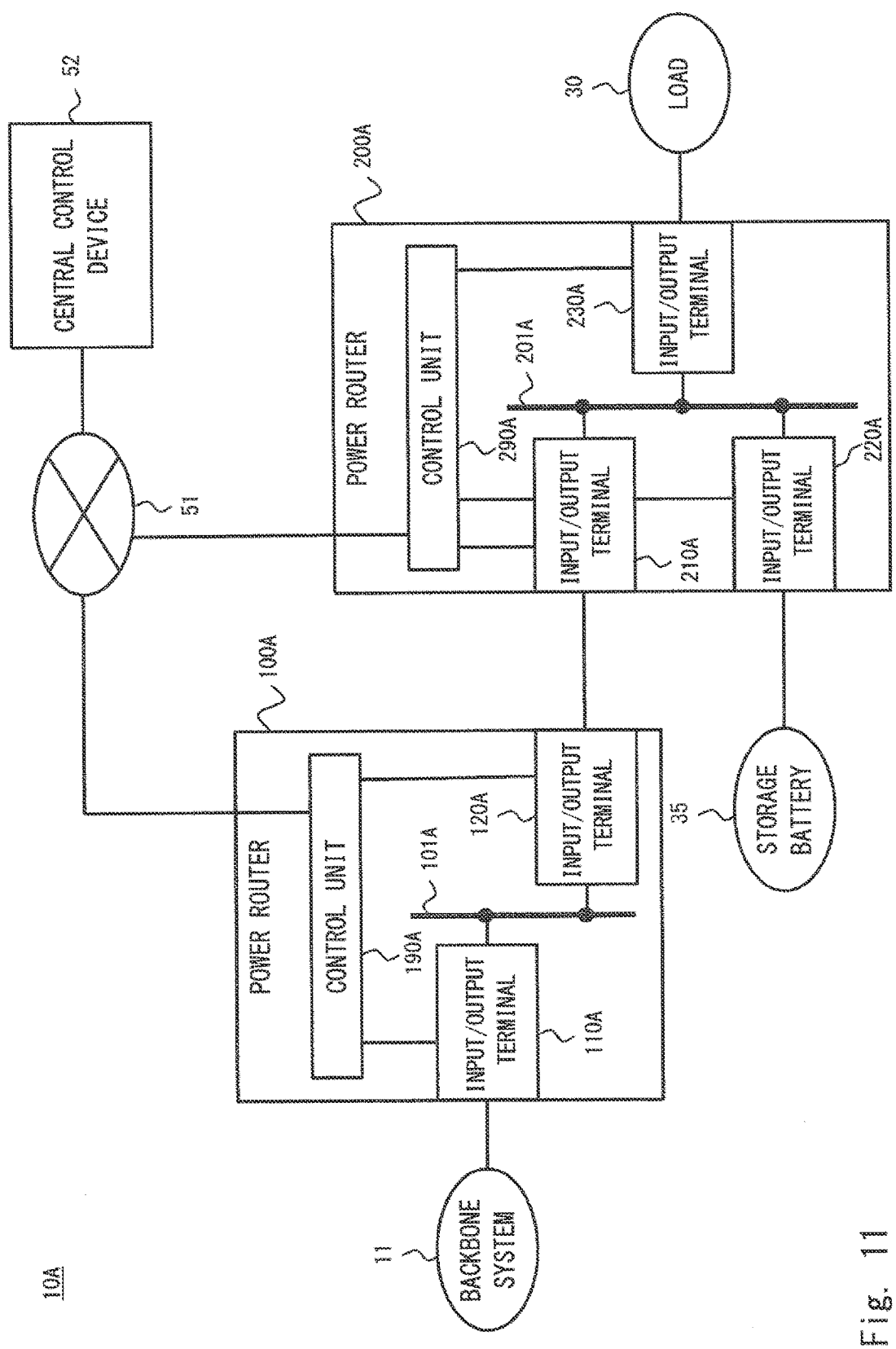
FIG. 11 is a block diagram showing a configuration of a power network system according to a first exemplary embodiment of the present invention.

FIG. 11 is a block diagram showing a configuration of a power network system 10A according to the first exemplary embodiment of the present invention. In the power network system 10A, a power router 100A, a power router 200A, and a central control device 52 are connected to each other through a communication network 51. The power router 100A is connected between a core system 11 and the power router 200A in such a manner that power can be transmitted between the core system 11 and the power router 200A. Further, the power router 200A is connected with the power router 100A, a storage battery 35, and a load 30 in such a manner that power can be transmitted among the power router 100A, the storage battery 35, and the load 30. Therefore, when power is transmitted from the core system 11 to the load 30, it is transmitted through the power routers 100A and 200A, which are connected in a multi-stage configuration. The power routers 100A and 200A belong to mutually different power cells (not shown) and connect their respective power cells to external power systems in an asynchronous manner. Note that the core system 11, the load 30, the storage battery 35, and the communication network 51 are similar to those explained above. Further, the connection destination of the power router 100A or 200A in FIG. 11 is merely an example and it is not limited to this example.

The power router 100A includes a DC bus 101A, an input/output terminal 110A, an input/output terminal 120A, and a control unit 190A. The input/output terminal 110A is connected to the core system 11 and the input/output terminal 120A is connected to an input/output terminal 210A of the power router 200A. Further, the power router 200A includes a DC bus 201A, an input/output terminal 210A, an input/output terminal 220A, an input/output terminal 230A, and a control unit 290A. The input/output terminal 210A is connected to the input/output terminal 120A and the input/output terminal 220A is connected to the storage battery 35. Further, the input/output terminal 230A is connected to the load 30. Each of the input/output terminals 110A, 120A, 210A, 220A and 230A may have a configuration corresponding to the above-described leg. Note that in the first exemplary embodiment, each of the input/output terminals 110A, 210A and 220A has to be capable of at least receiving power from a connection destination and outputting the received power to the DC bus 101A or 201A. Further, each of the input/output terminals 120A and 230A has to be capable of at least receiving power from the DC bus 101A or 201A and outputting the received power to a connection destination. Similarly to the previously-described DC bus, each of the DC buses 101A and 201A is maintained at a predetermined rated voltage. The control unit 190A performs various kinds of control for the input/output terminals 110A and 120A including the control of the operating mode. Similarly, the control unit 290A performs various kinds of control for the input/output terminals 210A, 220A and 230A including the control of the operating mode. Note that each of the control units 190A and 290A also has functions similar to those of the control unit 190 shown in FIG. 1.

Figure 12:
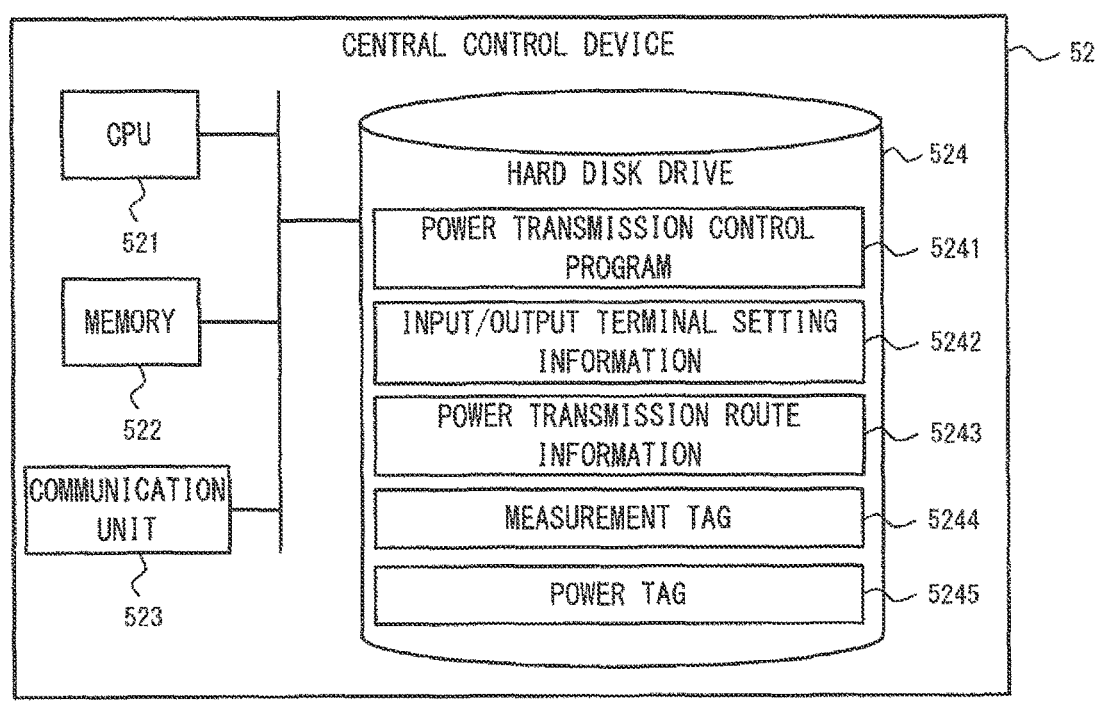
FIG. 12 is a block diagram showing a configuration of a central control device according to the first exemplary embodiment of the present invention.

FIG. 12 is a block diagram showing a configuration of the central control device 52 according to the first exemplary embodiment of the present invention. The central control device 52 is an information processing device that manages the power routers 100A and 200B and so on. The central control device 52 includes a CPU (Central Processing Unit) 521, a memory 522, a communication unit 523, and a hard disk drive 524.

The hard disk drive 524 is a nonvolatile storage device. The hard disk drive 524 stores an OS (not shown), a power transmission control program 5241, input/output terminal setting information 5242, power transmission route information 5243, a measurement tag 5244, a power tag 5245, and so on. Note that the power transmission control program 5241 is a computer program in which a power tag generation process (e.g., a process shown in FIG. 19, which is described later) and so on according to the first exemplary embodiment of the present invention are implemented.

The input/output terminal setting information 5242 is information in which a start time, an end time, active power, and so on of an input or an output in each input/output terminal for the transmission of a predetermined amount of power from a given transmission source to a given transmission destination are defined in advance. The power transmission route information 5243 is information in which a power transmission route with a connection relation of each input/output terminal for the transmission of a predetermined amount of power from a given transmission source to a given transmission destination defined therein is defined.

The measurement tag 5244 is information including a measurement value for received power measured in each input/output terminal, a measurement time period, and identification information of an input/output terminal part where the measurement is carried out (hereinafter called "measured input/output terminal part"). The measurement tag 5244 includes, for example, a measurement tag ID, a power router ID, an input/output terminal ID, an input/output, a measurement start time, an end time, measurement power information (e.g., power [W] and energy (i.e., electric energy) [kWh]), and so on. However, it is not limited to the aforementioned information items.

The power tag 5245 is information that is obtained by combining additional information related to a transmission source for an input/output terminal part(s) included in the measurement tag with information in that measurement tag. The power tag 5245 includes, for example, a power tag ID, a power router ID, an input/output terminal ID, an input/output, a date, a time period, a transmission source, breakdown power information (e.g., power [W] and energy [kWh]), and so on. However, it is not limited to the aforementioned information items. Therefore, when power from a plurality of transmission sources are mixed with each other, the power tag 5245 is generated for each transmission source even if it is for the same input/output terminal and the same time period.

The CPU 521 controls various processes in the central control device 52, access to the memory 522, the communication unit 523, and the hard disk drive 524, and so on. The communication unit 523 communicates with external entities including the power routers 100A and 200B and so on.

In the central control device 52, the CPU 521 reads the OS, the power transmission control program 5241, or the like stored in the memory 522 or the hard disk drive 524, and executes the read program or the like. In this way, the central control device 52 can carry out a power tag generation process and so on.

Figure 13:
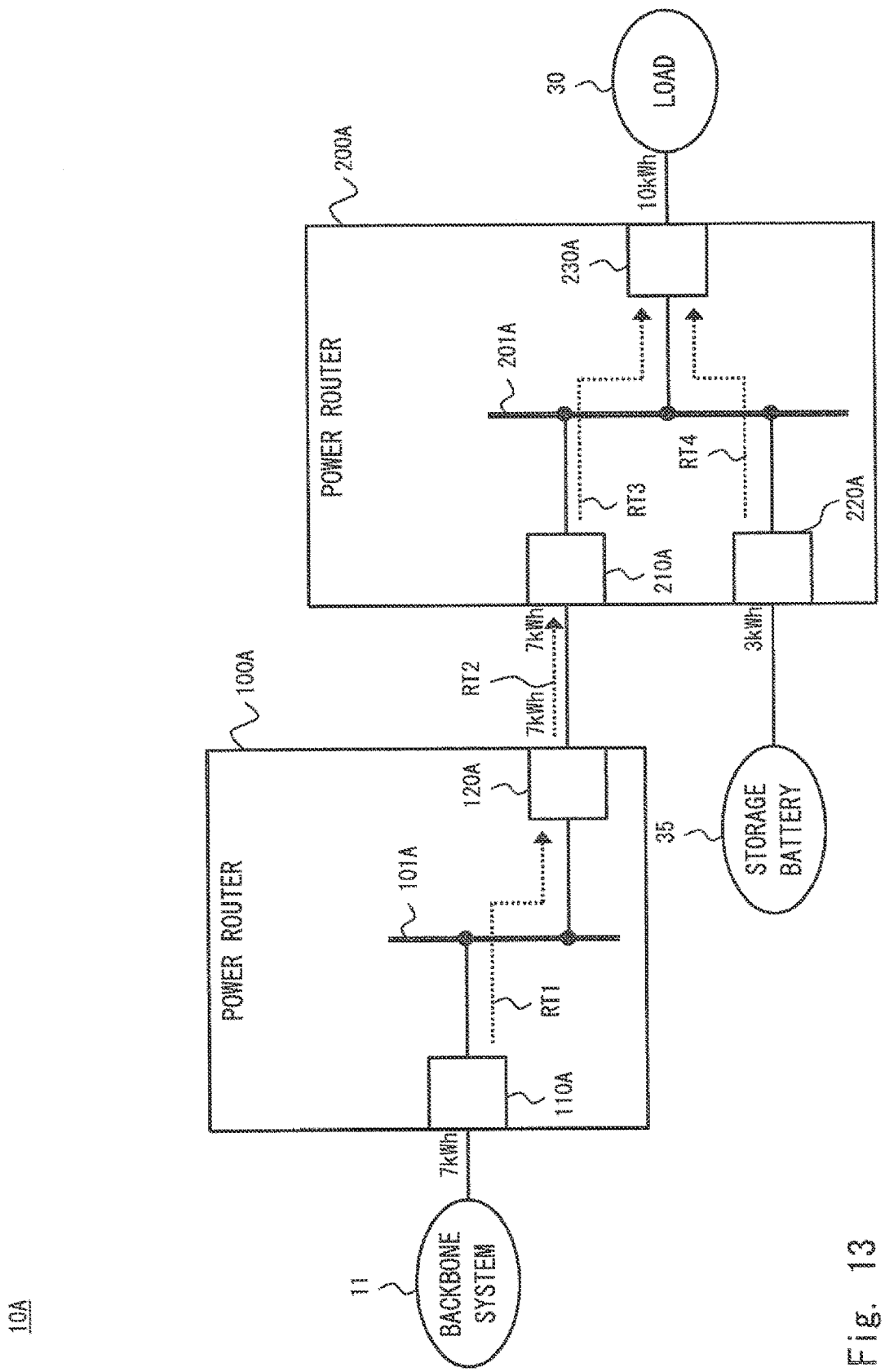
FIG. 13 shows an example of power transmission according to the first exemplary embodiment of the present invention.

Here, the generation of power information that is performed when a predetermined amount of power is transmitted from a given transmission source to a given transmission destination in the power network system 10A is explained hereinafter. FIG. 13 shows an example of power transmission according to the first exemplary embodiment of the present invention. That is, FIG. 13 shows a case where power from the core system 11 and that from the storage battery 35 are mixed with each other and the mixed power is transmitted to the load 30. Specifically, power of "7 kWh" is input from the core system 11 to the input/output terminal 110A of the power router 100A. Then, the power of "7 kWh" is fed from the input/output terminal 110A to the input/output terminal 120A through a route RT1; from the input/output terminal 120A to the input/output terminal 210A through a route RT2; and from the input/output terminal 210A to the input/output terminal 230A through a route RT3. Meanwhile, power of "3 kWh" is input from the storage battery 35 to the input/output terminal 220A of the power router 200A; and from the input/output terminal 220A to the input/output terminal 230A through a route RT4. Therefore, as a result, power of "10 kwh" is transmitted from the input/output terminal 230A to the load 30.

Figure 14:
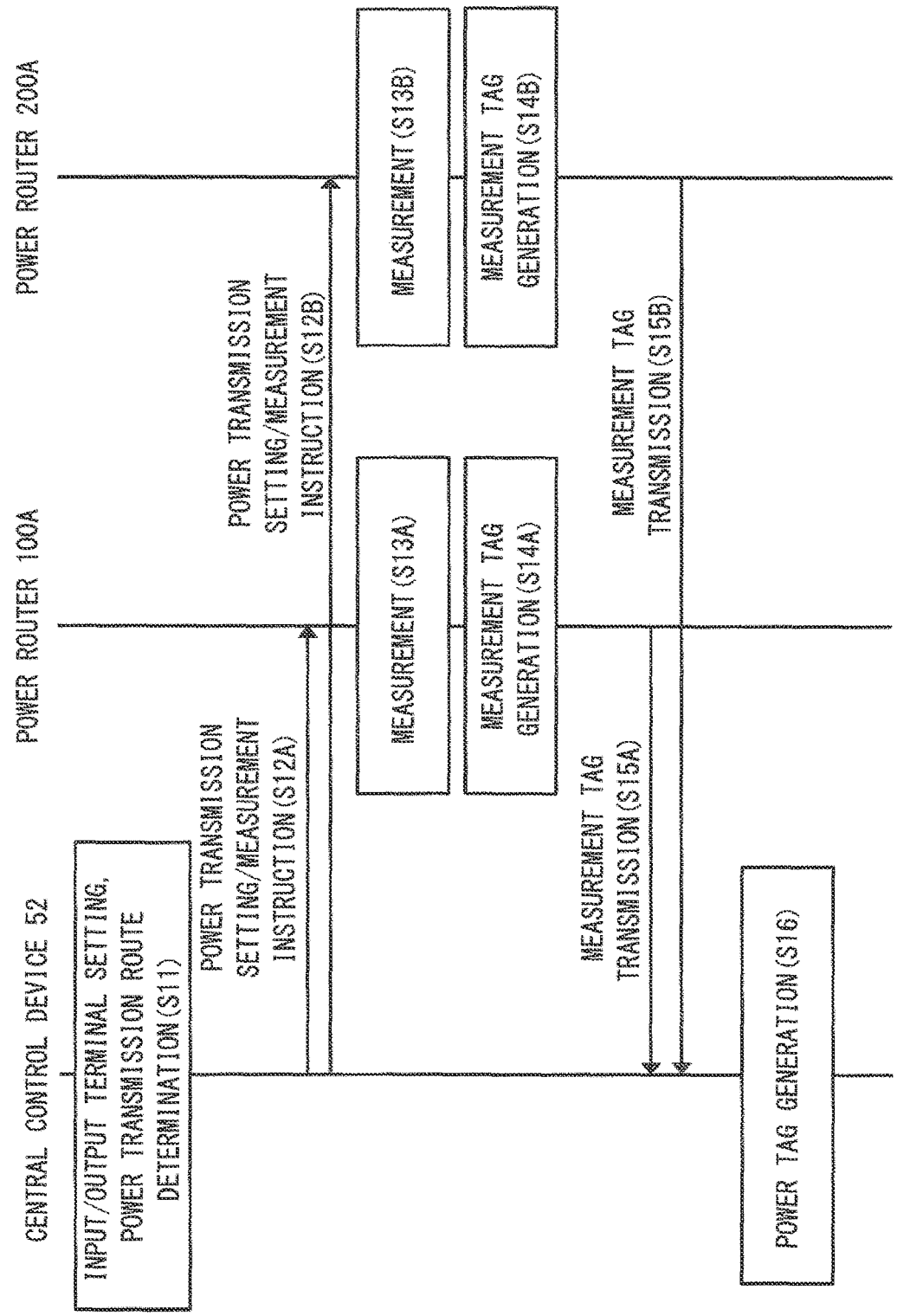
FIG. 14 is a sequence diagram of a power transmission process according to the first exemplary embodiment of the present invention.

FIG. 14 is a sequence diagram of a power transmission process according to the first exemplary embodiment of the present invention. Firstly, the central control device 52 sets input/output terminals and determines power transmission routes (S1). For example, the central control device 52 receives a request for power transmission shown in FIG. 13 from an external entity. Then, the central control device 52 sets input/output terminals and determines power transmission routes in order to carry out the power transmission according to this request.

Note that FIG. 15 shows an example of an input/output terminal setting management table according to the first exemplary embodiment of the present invention. For example, the central control device 52 makes settings ST1 to ST5 as shown in FIG. 15 and stores the settings into the hard disk drive 524 as input/output terminal setting information 5242.

Further, FIG. 16 shows an example of power transmission route information according to the first exemplary embodiment of the present invention. FIG. 16 shows an example in which identification information of input/output terminals that become transmission sources are associated with that of input/output terminals that become transmission destinations in a one-to-one relation irrespective of whether they are located inside power routers or not, and those associations are defined as their respective routes. For example, the input/output terminal 230A is the transmission destination of both of the routes RT3 and RT4. Therefore, this indicates that power from the input/output terminals 210A and 220A are mixed and the mixed power is received in the input/output terminal 230A. Note that the expressions of power transmission route information are not limited to the above-shown example. The central control device 52 defines, for example, the routes RT1 to RT4 as shown in FIG. 16 and stores them into the hard disk drive 524 as power transmission route information 5243.

Next, the central control device 52 instructs the power routers 100A and 200A to perform power transmission settings and power measurement (S12A and S12B). That is, the central control device 52 transmits the above-described instruction to the power routers 100A and 200A through the communication network 51. As a result, each of the control units 190A and 290A of the power routers 100A and 200A, respectively, instructs its internal input/output terminal(s) to perform power transmission and measure power received in each input/output terminal. For example, each of the control units 190A and 290A may set a measurement interval.

Then, each input/output terminal measures its received power (S13A and S13B). Note that each input/output terminal measures an energy. Alternatively, each input/output terminal may measure a quantity other than the energy. After that, each input/output terminal notifies the control unit of the power router of the measured measurement value. Then, each control unit generates a measurement tag including the notified measurement value, a measurement time period, and identification information of the measured input/output terminal(s) (S14A and S14B) and transmits the generated measurement tag to the central control device 52 (S15A and S15B). FIG. 17 shows an example of measurement tags according to the first exemplary embodiment of the present invention.

After that, the central control device 52 generates a power tag in the power transmission based on the measurement tags received from the control unit of each power router located on the power transmission route (S16). That is, the central control device 52 generates, as power information, a power tag including information about the power transmission sources for the input/output terminal parts included in the received measurement tags by using those measurement tags. Note that examples of the additional information include information that cannot be obtained by the measurement alone, such as the power selling price of power in its power transmission source, a $CO_2$ emission coefficient, the type of power generation (nuclear power, thermal power, pumping-up power, wind power, and so on), and a contract ID related to the power transmission. However, the additional information is not limited to the aforementioned information items. FIG. 18 shows an example of power tags according to the first exemplary embodiment of the present invention.

Figure 19:
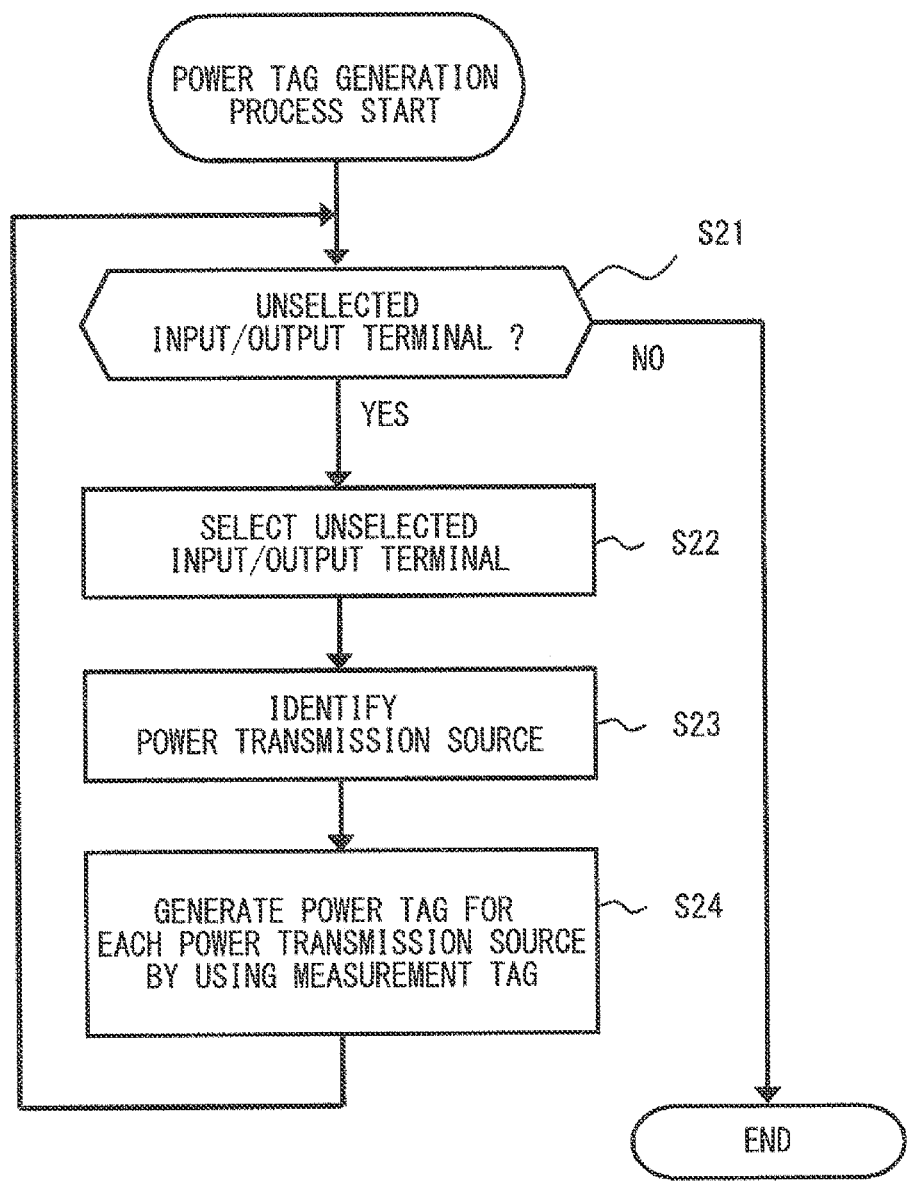
FIG. 19 is a flowchart showing a power tag generation process flow according to the first exemplary embodiment of the present invention.

FIG. 19 is a flowchart showing a power tag generation process flow according to the first exemplary embodiment of the present invention. Firstly, the central control device 52 determines whether or not there is any unselected input/output terminal (S21). That is, the central control device 52 determines whether or not there is an input/output terminal for which a power tag should be generated. Specifically, the central control device 52 determines, in a given time period in the power transmission, whether or not there is a measurement tag that corresponds to one of the input/output terminals located on the power transmission route but has not yet been processed.

When there is an unselected input/output terminal, the central control device 52 selects the unselected input/output terminal (S22). Then, the central control device 52 identifies the power transmission source of power received in each input/output terminal part in each power router located on the power transmission route based on the input/output terminal setting information 5242 (S23). It should be noted that when power received in the input/output terminal is mixed power, a plurality of power transmission sources are identified. Next, the central control device 52 generates a power tag for each of the identified power transmission sources by using the measurement tag (S24). That is, the central control device 52 generates a power tag by combining the above-described additional information with the measurement tag and stores the generated power tag into the hard disk drive 524.

After that, the central control device 52 repeats the processes in the steps S21 to S24 as long as there is an unselected input/output terminal. When there is no input/output terminal for which a power tag should be generated in the step S21, the power tag generation process is finished.

In this way, by using power tags, it is possible to recognize a breakdown of power (i.e., identify each of a plurality of power supply sources of power) received in a given input/output terminal based on a respective power tag. For example, based on a measurement tag MT5, "10.0 kWh" is received in total in the input/output terminal 230A (FIG. 17). Further, as its breakdown, it can be recognized that the power transmission source of "7.0 kWh" is the input/output terminal 210A and the power transmission source of "3 kWh" is the input/output terminal 220A (FIG. 18).

Note that in the first exemplary embodiment of the present invention, it is also possible to recognize a breakdown of power by using power information other than the power tags. As a precondition, assume that: one of the input/output terminal parts of a first power router (e.g., power router 100A) among a plurality of power routers is a first power transmission source (e.g., input/output terminal 110A connected to the core system 11); one of the input/output terminal parts of a second power router (e.g., power router 200A) is a second power transmission source (e.g., input/output terminal 220A); another one of the input/output terminal parts of the second power router is a power transmission destination (e.g., input/output terminal 230A connected to the load 30); and an input/output terminal part(s) that is different from the second power transmission source and the power transmission destination and receives power from the first power transmission source is an intermediate input/output terminal(s) (or first input/output terminal part) (e.g., input/output terminal 210A). Further, it is assumed that a predetermined amount of power is transmitted to the input/output terminal part at the power transmission destination through the first input/output terminal part, the input/output terminal part at the second power transmission source, and the DC bus. Note that in the example shown in FIG. 11, the supply source of the power transmitted from the second power transmission source may be a supplementary power supply source for adjusting for the excess/deficiency of the power transmitted through the first power transmission source in the transmission of the predetermined amount of power.

Note that the power information about power received in the power transmission destination may include at least identification information of the first power transmission source and an intermediate measurement value, i.e., a measurement value of power received in the intermediate input/output terminal part in a predetermined time period. Note that the identification information of the first power transmission source is information for uniquely identifying each input/output terminal part in all the power routers in the power network system 10A. For example, the identification information of the first power transmission source may be expressed by a combination of a power router ID (e.g., an ID of the power router 100A) and a leg ID (e.g., an ID of the input/output terminal 110A). Note that the intermediate input/output terminal part(s) may be an input/output terminal part(s) in each power router through which the predetermined amount of power is transmitted. For example, the intermediate input/output terminal part(s) is the input/output terminals defined in the routes RT1 to RT5. Further, the intermediate input/output terminal part is an input/output terminal part that receives the power that is transmitted from the first power transmission source but has not yet been mixed with the power transmitted from the second power transmission source. For example, the power received in the input/output terminal 120A or the input/output terminal 210A is the power of "7 kWh" transmitted from the core system 11, which is the first power transmission source. Further, it is the power that has not mixed with the power of "3 kWh" transmitted from the storage battery 35, which is the second power transmission source.

Figure 20:
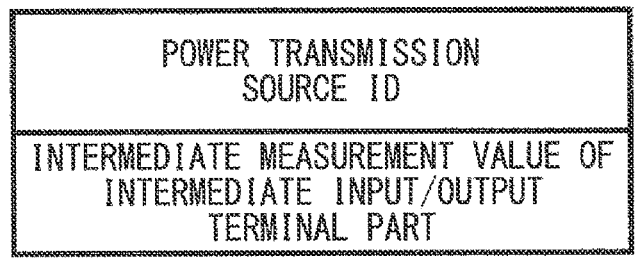
FIG. 20 shows a structure example power information according to the first exemplary embodiment of the present invention.
Figure 21:
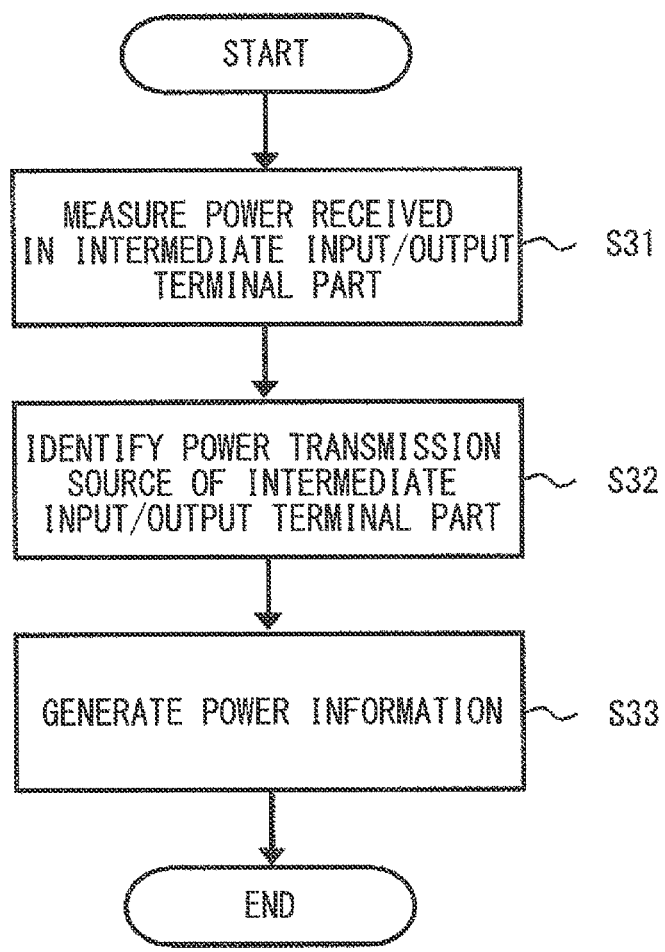
FIG. 21 is a flowchart showing a power information generation process flow according to the first exemplary embodiment of the present invention.

FIG. 20 shows a structure example of power information according to the first exemplary embodiment of the present invention. That is, the power information may include at least an ID of the power transmission source (e.g., the above-described "power router ID+leg ID") and an intermediate measurement value of power measured in the intermediate input/output terminal part in a predetermined time period. Note that when the predetermined time period is an arbitrary time period, the power information preferably includes the measurement time period itself. On the other hand, when the predetermined time period is a time period that is defined in advance, the power information does not necessarily have to include the measurement time period itself. FIG. 21 is a flowchart showing a power information generation process flow according to the first exemplary embodiment of the present invention. Firstly, the intermediate input/output terminal part measures power received in the intermediate input/output terminal part itself (S31).

Then, for example, the intermediate input/output terminal part transmits the intermediate measurement value to the central control device. Next, the central control device identifies the (first) power transmission source of the intermediate input/output terminal part based on power transmission route information (S32). After that, the central control device generates power information including the intermediate measurement value and identification information of the identified first power transmission source (S33).

Therefore, by checking the power information, it is possible to recognize that, of the whole power indicated by the measurement value measured in the power transmission destination, at least power indicated by the intermediate measurement value has been transmitted from at least one of the plurality of power transmission sources (because losses in the power are ignored in this example). Therefore, it can also be recognized that the power measured at the power transmission destination includes power that has been transmitted from other(s) of the plurality of power transmission sources.

Further, the intermediate input/output terminal part is preferably an input/output terminal part that is located in a power router in which the power transmission destination is located and receives power from the other power router(s). For example, the intermediate input/output terminal part is preferably an input/output terminal 210B. This configuration improves the accuracy of the recognition (i.e., the identification) because the intermediate measurement value is a measurement value immediately prior to the mixing of the power.

Second Exemplary Embodiment of the Invention

Figure 22:
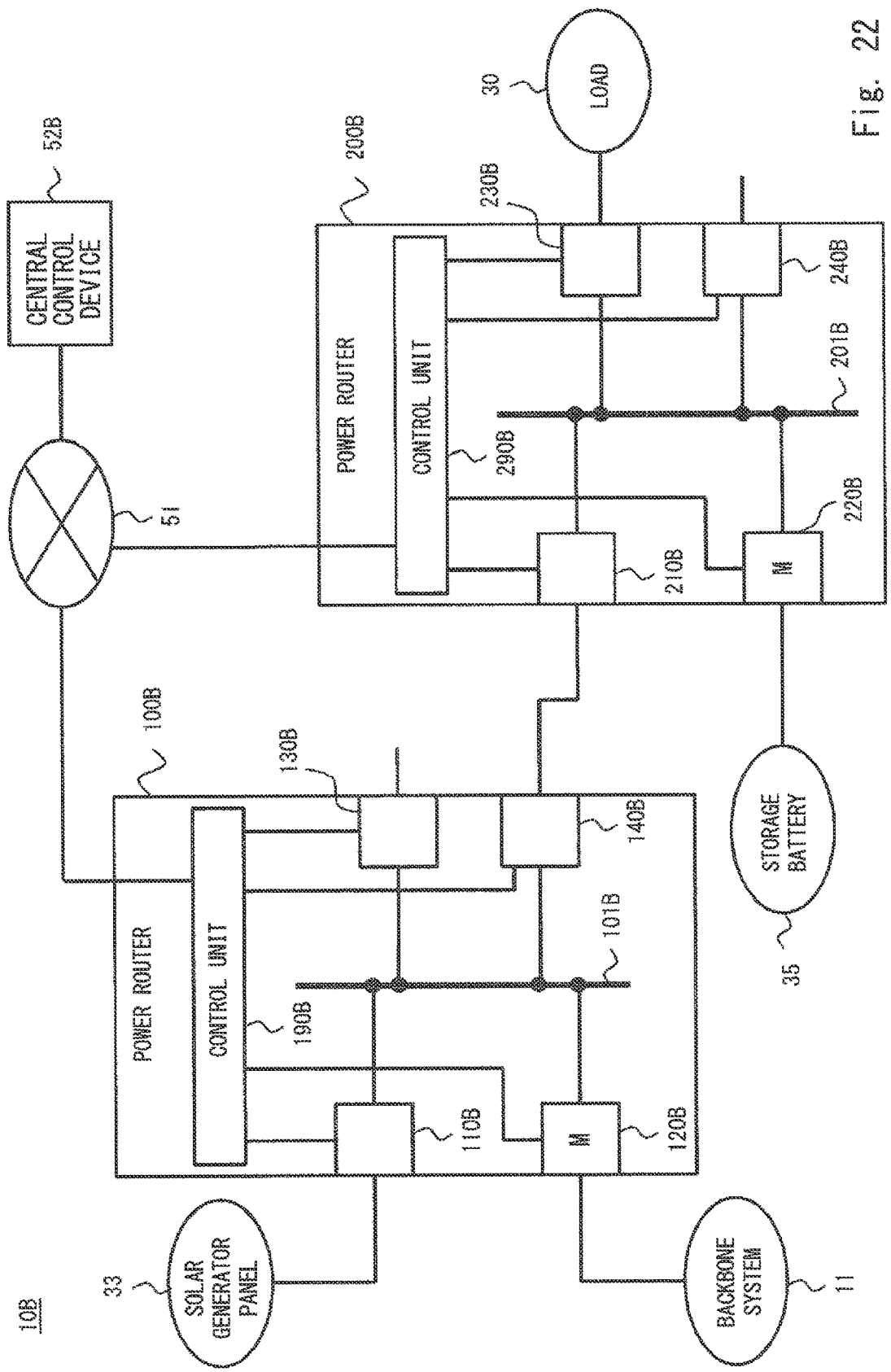
FIG. 22 is a block diagram showing a configuration of a power network system according to a second exemplary embodiment of the present invention.

In a second exemplary embodiment of the present invention, the first exemplary embodiment of the present invention is modified so that a breakdown of power can be recognized (i.e., each power supply source is identified) even when losses in the power that occur during the power transmission are taken into account. FIG. 22 is a block diagram showing a configuration of a power network system 10B according to a second exemplary embodiment of the present invention. In the power network system 10B, a power router 100B, a power router 200B, and a central control device 52B are connected to each other through a communication network 51. The power router 100B is connected with a core system 11, a solar generator panel 33, and a power router 200B in such a manner that power can be transmitted among the core system 11, the solar generator panel 33, and the power router 200B. Further, the power router 200B is connected with the power router 100B, a storage battery 35, and a load 30 in such a manner that power can be transmitted among the power router 100B, the storage battery 35, and the load 30. Further, the connection destination of the power router 100B or 200B in FIG. 22 is merely an example and it is not limited to this example.

The power router 100B includes a DC bus 101B, input/output terminals 110B, 120B, 130B and 140B, and a control unit 190B. The input/output terminal 110B is connected to the solar generator panel 33 and the input/output terminal 120B is connected to the core system 11. Further, the input/output terminal 140B is connected to an input/output terminal 210B of the power router 200B. Note that the input/output terminal 130B may be connected to an external entity.

The power router 200B includes a DC bus 201B, input/output terminals 210B, 220B, 230B and 240B, and a control unit 290B. The input/output terminal 210B is connected to the input/output terminal 140B and the input/output terminal 220B is connected to the storage battery 35. Further, the input/output terminal 230B is connected to the load 30. Note that the input/output terminal 240B may be connected to an external entity.

Note that the input/output terminals 120B and 220B are operated and controlled in the above-described master mode. Therefore, the input/output terminal 120B transmits/receives power to/from the core system 11 in order to maintain the DC bus 101B at its rated voltage. Similarly, the input/output terminal 220B transmits/receives power to/from the storage battery 35. For example, when power is transmitted from the solar generator panel 33 to the load 30 through the power routers 100B and 200B, there is a possibility that sufficient power could not be output from the input/output terminal 140B due to power losses occurring on the power transmission route even when the originally-determined power (e.g., power specified in a power buying contract) is received from the solar generator panel 33 in the input/output terminal 110B. In such cases, the input/output terminal 120B acquires power equivalent to the shortage from the core system 11 and supplies the acquired power to the DC bus 101B. Similarly, the input/output terminal 220B acquires power equivalent to the shortage from the storage battery 35 and supplies the acquired power to the DC bus 201B.

Therefore, when the solar generator panel 33 is the power supply source to be purchased in a power buying contract, the core system 11 and the storage battery 35 can serve as supplementary power supply sources. That is, although the core system 11 and the storage battery 35 are not entities from which power is directly bought, they can serve as entities which supply power depending on the power loss situation and for which payment is made for the supplied power.

For the other configuration, each component/structure of the power routers 100B and 200B may have a function similar to that of the power routers 100A and 100B shown in FIG. 11.

Figure 23:
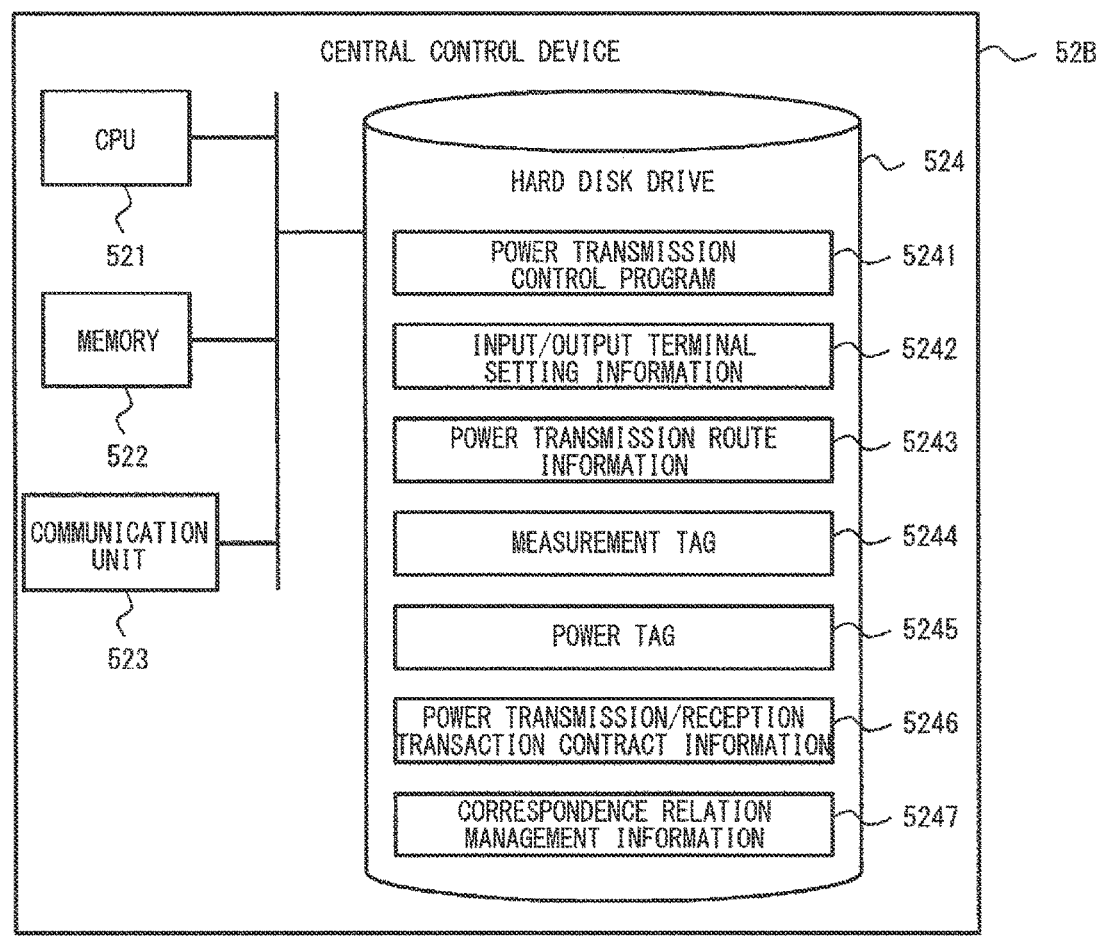
FIG. 23 is a block diagram showing a configuration of a central control device according to the second exemplary embodiment of the present invention.

FIG. 23 is a block diagram showing a configuration of the central control device 52B according to the second exemplary embodiment of the present invention. A hard disk drive 524 of the central control device 52B stores power transmission/reception transaction contract information 5246 and correspondence relation management information 5247 in addition to the information items shown in FIG. 12. Note that the power transmission/reception transaction contract information 5246 is contract information for transmitting a predetermined amount of power from a first power transmission source (e.g., the input/output terminal 110B connected to the solar generator panel 33) to a power transmission destination (e.g., the input/output terminal 230B connected to the load 30). The power transmission/reception transaction contract information 5246 includes, for example, a contract ID, a power transmitting entity ID, a power receiving entity ID, a date, a time period, a contract time, a transaction energy, a price, a CO2 emission coefficient, the type of power generation, and so on. However, the power transmission/reception transaction contract information 5246 does not need to include all of them and may include other information items. Further, the correspondence relation management information 5247 is a table for managing associations between contract IDs and setting IDs. Note that the way of managing the association between the power transmission/reception transaction contract information 5246 and the correspondence relation management information 5247 is not limited to the above-described table.

Further, the central control device 52B may function as a power transaction device in addition to having functions similar to those of the central control device 52 shown in FIG. 12. The power transaction device is, for example, an information system that supports a power transaction contract between a power vendor and a power buyer. Note that the power transaction device may be implemented by a computer independent of the central control device 52B. In that case, the power transaction device may be connected to another communication network connected to the communication network 51 or the central control device 52B.

Further, the central control device 52B sets power transmission route information 5243 by defining a connection relation of each input/output terminal part based on the power transmission/reception transaction contract information 5246. Note that the power transmission route information 5243 does not need to include the connection relation of each input/output terminal part but does need to specify at least the definitions of input/output terminals for generating power information.

Note that in the power router 100B according to the second exemplary embodiment of the present invention, power can be supplied from external entities through a plurality of input/output terminals, and through the DC bus 101B, power is output to external entities from a plurality of input/output terminals. In such cases, there are several methods for carrying out the distribution of power from the DC bus 101B to a plurality of input/output terminals. Examples of those methods include ones shown in FIGS. 24 and 25.

Figure 24:
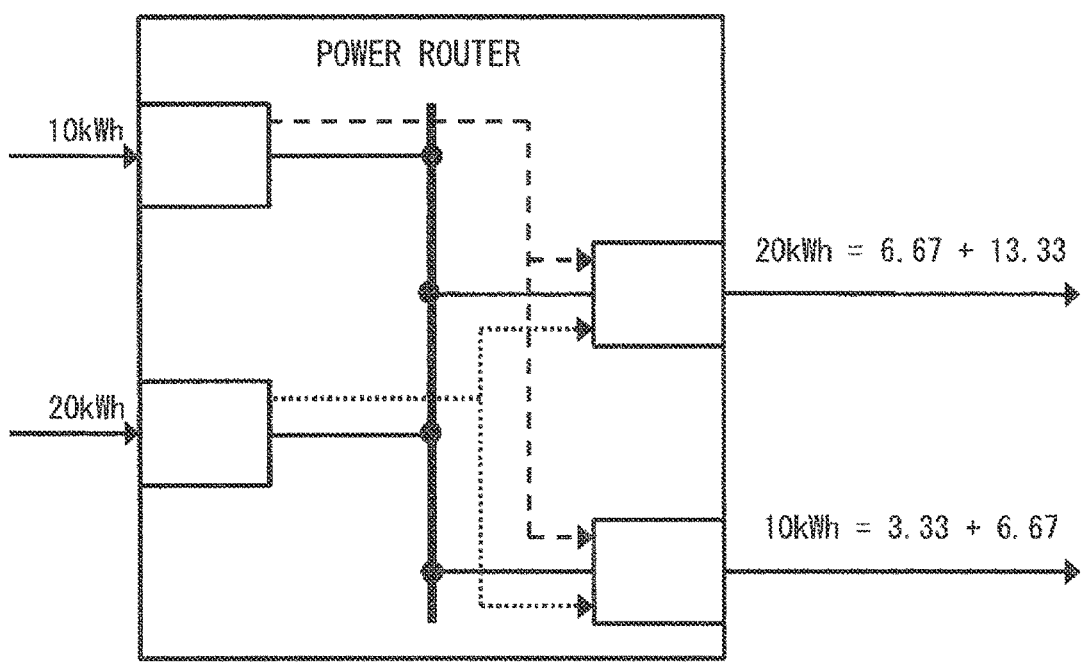
FIG. 24 shows an example of an association between input power and output power according to the second exemplary embodiment of the present invention.
Figure 25:
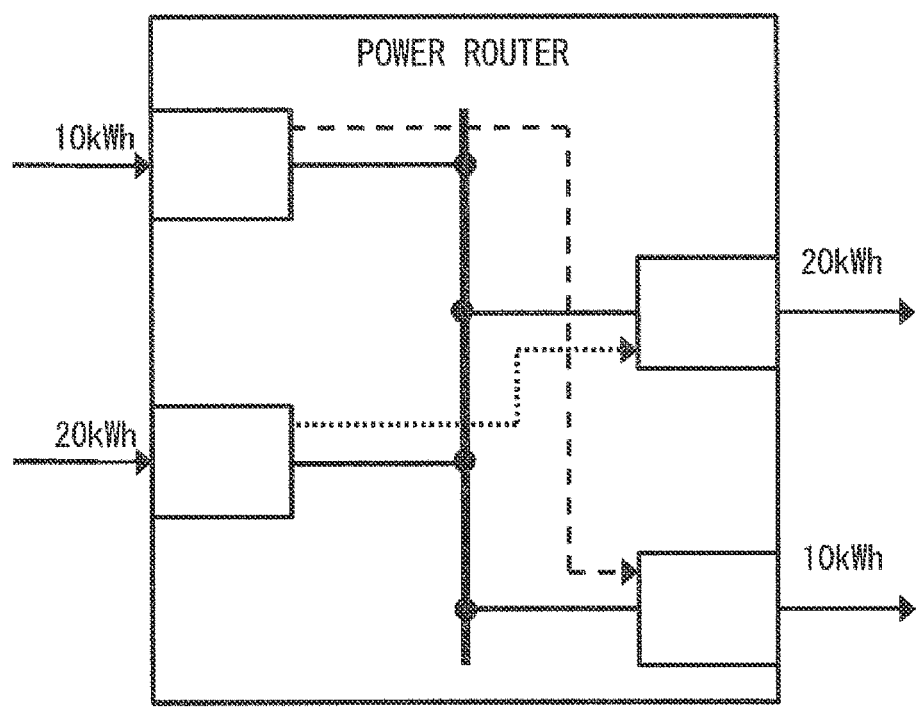
FIG. 25 shows another example of an association between input power and output power according to the second exemplary embodiment of the present invention.

FIG. 24 shows an example of an association between input power and output power according to the second exemplary embodiment of the present invention. In this example, power is supplied from each of two terminals and the supplied power is distributed to other two terminals in the same ratio as the ratio at which the power is supplied. FIG. 25 shows another example of an association between input power and output power according to the second exemplary embodiment of the present invention. In this example, power is also supplied from each of two terminals and the supplied power is distributed to other terminals in such a manner that the supply source terminals are associated with the output destination terminals in a one-to-one relation. Note the above-described power distribution methods are also applied to the power router 200B and the power distribution methods are not limited to the above-described methods.

Figure 26:
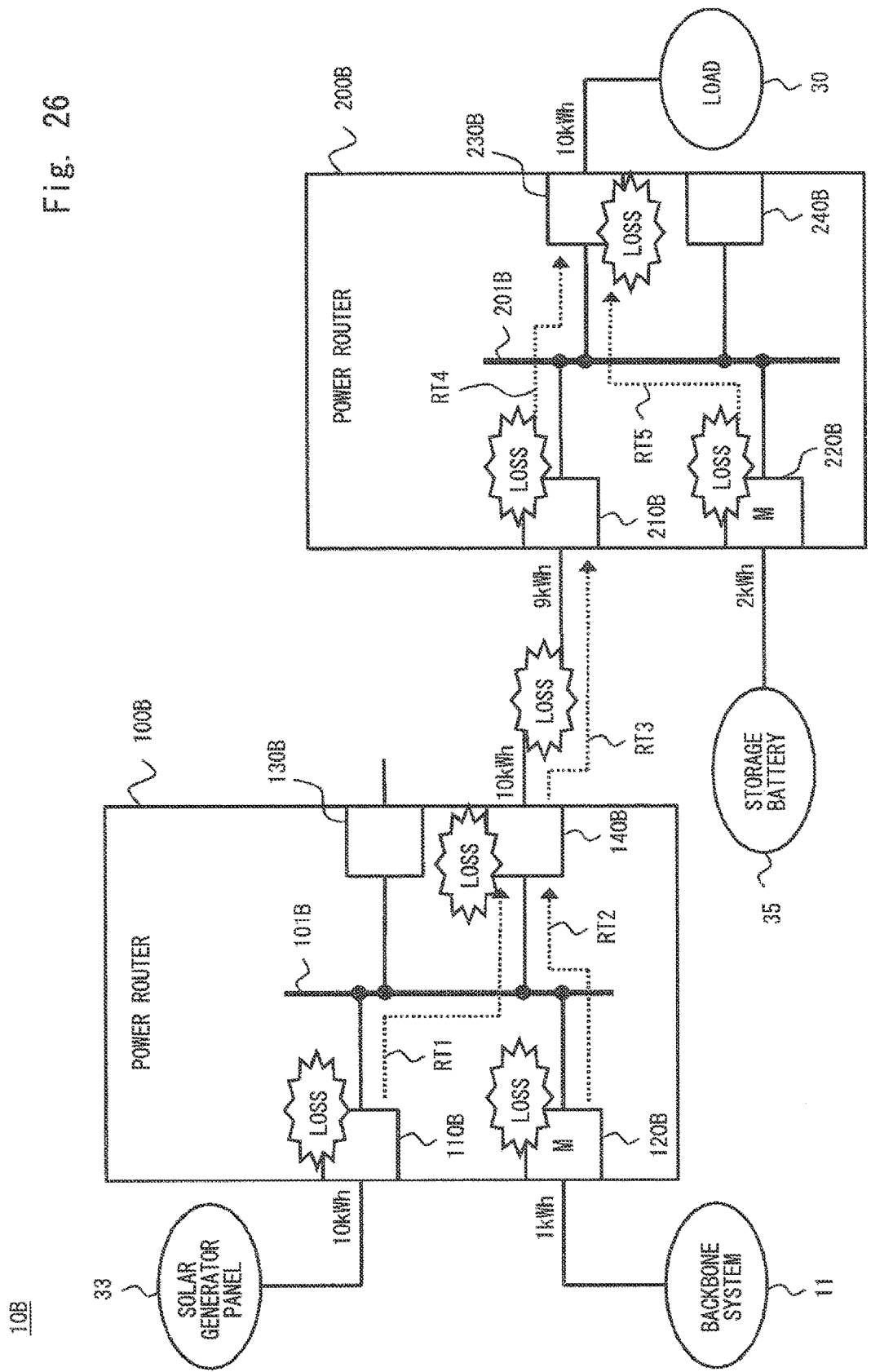
FIG. 26 shows an example of a power interchange according to the second exemplary embodiment of the present invention.

Here, the generation of power information in a case where a power interchange is performed when a predetermined amount of power is transmitted from a given power transmission source to a given power transmission destination in the power network system 10B is explained hereinafter. FIG. 26 shows an example of a power interchange according to the second exemplary embodiment of the present invention. In this example, it is assumed that power of "10 kWh" is transmitted from a solar generator panel 33 to a load 30 in a predetermined time period according to a power transaction contract.

For example, the above-described power transaction device transmits information about a power transaction contract concluded between a power vendor and a power buyer and a power interchange request to the central control device 52B based on that information. Then, the central control device 52B stores the received information into the hard disk drive 524 as power transmission/reception transaction contract information 5246.

FIG. 27 shows an example of a power transmission/reception transaction contract information management table according to the second exemplary embodiment of the present invention. For example, a contract C3 in FIG. 27 corresponds to the above-described contract. Note that as shown in FIG. 27, a plurality of power transaction contracts are made, and their dates and time periods can overlap each other. Note that the information held by the power transmission/reception transaction contract information management table is not limited to the above-described information items.

After that, the central control device 52B sets input/output terminals and determines power transmission routes according to the sequence shown in FIG. 14 (S11) and instructs the power routers 100B and 200B to perform power transmission settings and power measurement (S12A and S12B).

Note that FIG. 28 shows an example of an input/output terminal setting management table according to the second exemplary embodiment of the present invention. Note that input/output terminal setting management table may include other setting information such as active/reactive power ramp rate in addition to the information items shown in FIG. 28. Note that it is assumed that the central control device 52B makes settings ST1 to ST4 for directly carrying out the contact C3. That is, no setting for the input/output terminals 120B and 220B connected to the core system 11 and the storage battery 35, which are supplementary power supply sources, is made.

Further, FIG. 29 shows an example of a correspondence table between power transmission/reception contract information and an input/output terminal setting according to the second exemplary embodiment of the present invention. In this table, only the setting ST1, which is associated with the contract C3, among the settings ST1 to ST4 is shown because the following explanation is given for the contract C3. Since only the setting for the input/output terminal directly connected to the system or the power supply is managed (or stored), there is no need to manage (or store) all the correspondence relations, thus enabling the data capacity to be efficiently used.

Further, when the central control device 52B determines power transmission routes, the central control device 52B determines them while including power transmission routes for supplementary power for carrying out the contract C3. FIG. 30 shows an example of power transmission route information according to the second exemplary embodiment of the present invention. For example, routs RT2 and RT5 correspond to the power transmission routes for supplementary power for carrying out the contract C3.

After that, the transmission of power is actually started. Each input/output terminal measures power every time the power transmission is started (S13A and S13B). Further, each control unit generates a measurement tag (S14A and S14B) and transmits the generated measurement tag to the central control device 52B (S15A and S15B). After that, the central control device 52B performs a power tag generation process (S16).

However, it is assumed in the second exemplary embodiment that power losses occur in various places on the power transmission routes as shown in FIG. 26. A power interchange flow in this example is explained hereinafter.

Firstly, the input/output terminal 110B receives power of "10 kWh" from the solar generator panel 33 based on the setting ST1 and outputs the received power to the DC bus 101B. Further, the input/output terminal 140B tries to receive power of "10 kWh" from the DC bus 101B based on the setting ST2. In this process, power losses related to the input/output terminal 110B occur. Therefore, in actuality, the power of "10 kWh" is not entirely output from the input/output terminal 110B to the DC bus 101B. Therefore, the input/output terminal 120B receives power equivalent to the deficiency from the core system 11 and outputs the received power to the DC bus 101B in order to maintain the DC bus 101B at its rated voltage. However, power losses related to the input/output terminals 120B and 140B also occur. Therefore, it is assumed that power values shown in FIG. 26 are actually measured. Then, measurement tags MT1 to MT3 shown in FIG. 31 are generated. FIG. 31 shows an example of measurement tags according to the second exemplary embodiment of the present invention.

Next, power losses also occur in the power transmission from the input/output terminal 140B to the input/output terminal 210B. Further, power losses related to each of the input/output terminals 210B, 220B and 230B occur. Therefore, measurement tags MT4 to MT6 shown in FIG. 31 are generated. With the precondition that the measurement tags MT1 to MT 6 shown in FIG. 31 have been generated and stored in the central control device 52B as described above, a power tag generation process according to the second exemplary embodiment is explained hereinafter.

Figure 32:
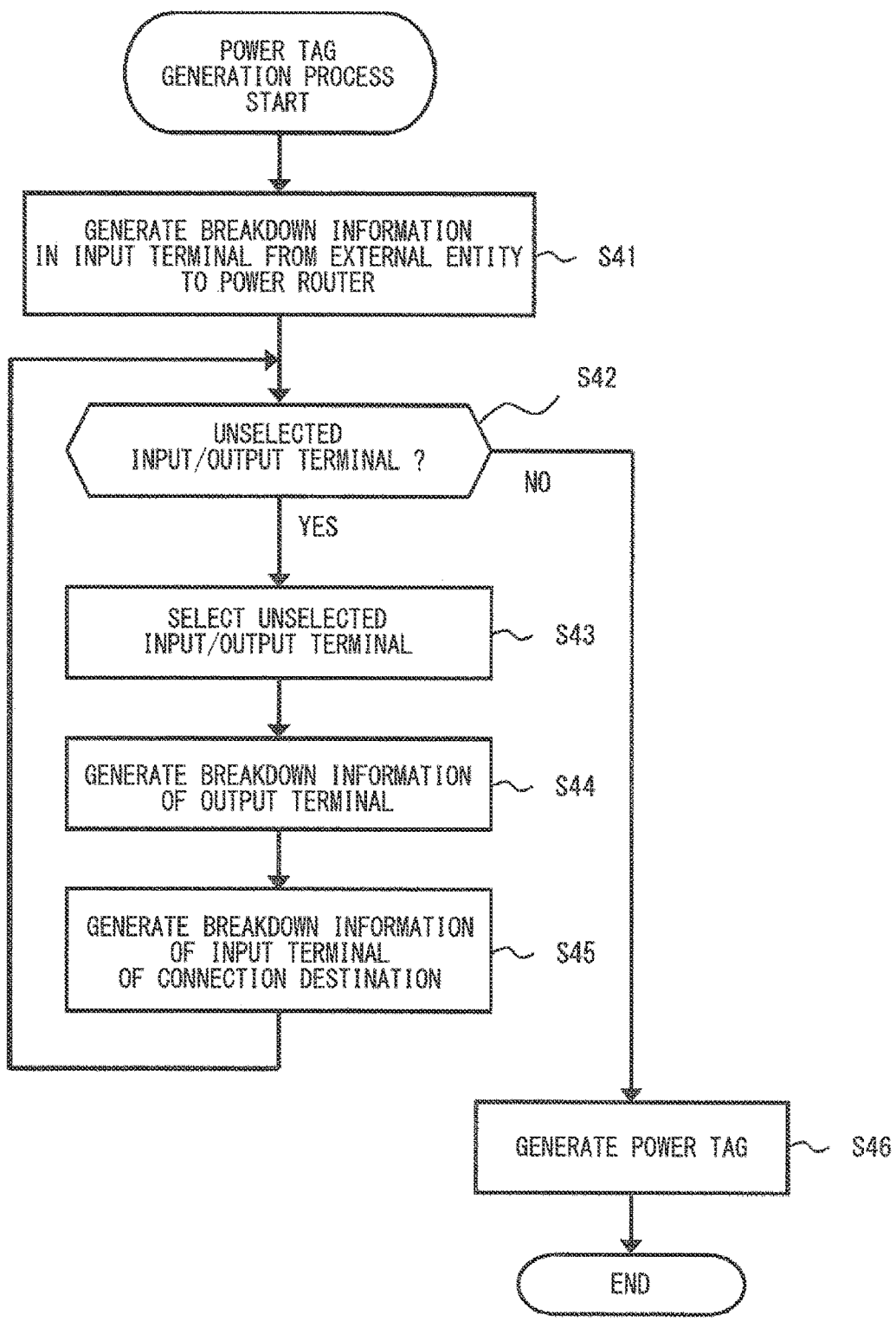
FIG. 32 is a flowchart showing a power tag generation process flow according to the second exemplary embodiment of the present invention.
Figure 36:
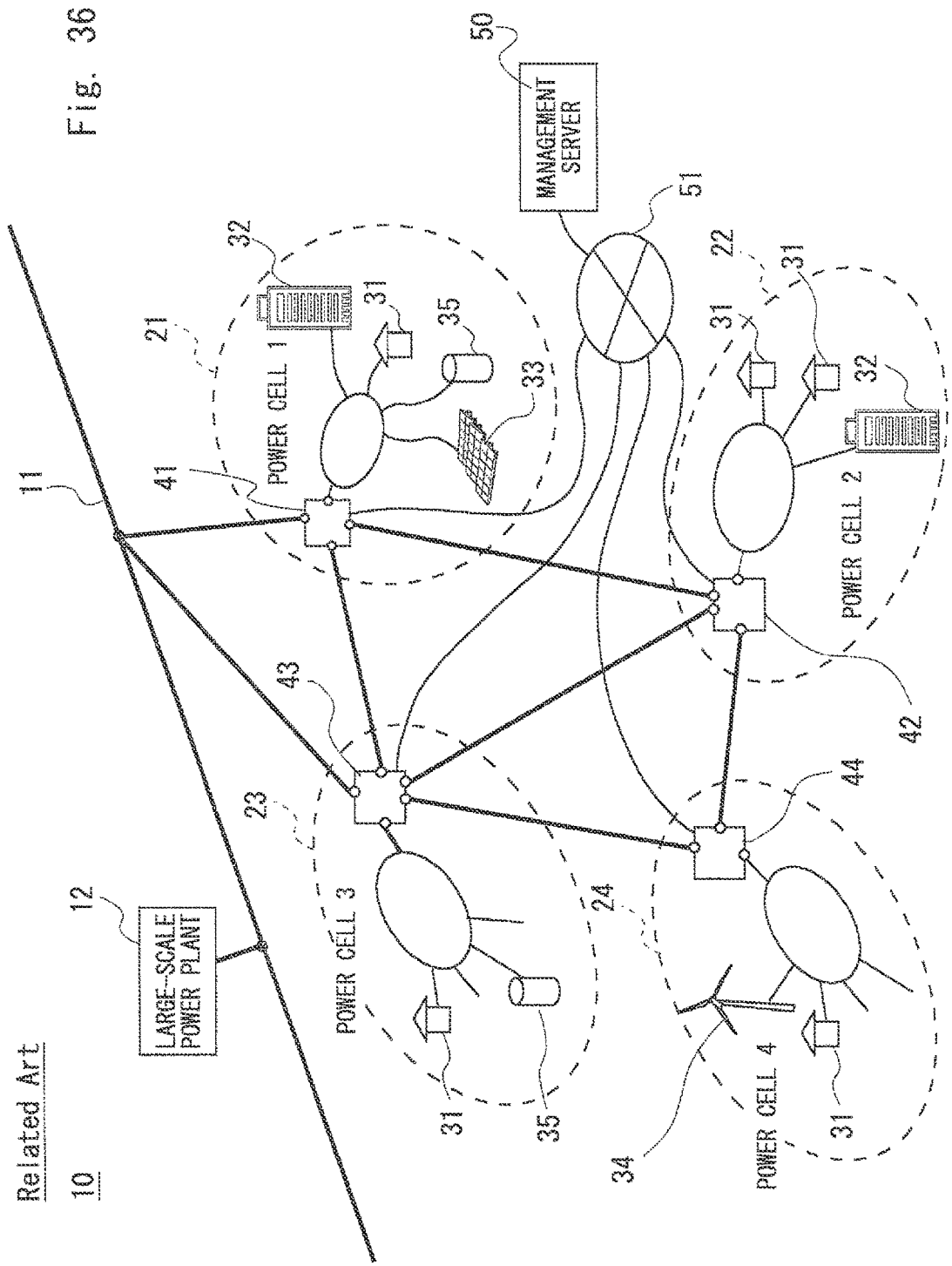
FIG. 36 is a diagram for explaining an outline of a system of a power network system.

FIG. 32 is a flowchart showing a power tag generation process flow according to the second exemplary embodiment of the present invention. Further, FIG. 33 shows an example of breakdown information according to the second exemplary embodiment of the present invention. FIG. 34 shows a calculation example of breakdown information according to the second exemplary embodiment of the present invention. FIG. 35 shows an example of power tags according to the second exemplary embodiment of the present invention. In the following explanation, a power tag generation process is explained while referring to FIGS. 33, 34 and 35 as required.

Firstly, the central control device 52B generates breakdown information in an input terminal located between an external entity and a power router (S41). That is, the central control device 52B selects an input/output terminal(s) among input/output terminals of a plurality of power routers that receives power from an external power system. For example, the central control device 52B selects input/output terminals 110B, 120B and 220B. Then, the central control device 52B generates first breakdown information including an energy received in the selected input/output terminal and identification information of the power transmission source of the received power based on a measurement tag. For example, the central control device 52B generates breakdown information including an energy of "10.0 kWh" received in the selected input/output terminal 110B and identification information of the solar generator panel 33, which is the power transmission source of the power, based on the measurement tag MT1 (FIG. 33). Further, the central control device 52B also generates breakdown information for each of the input/output terminals 120B and 220B in a similar manner.

Next, the central control device 52B determines whether or not there is unselected power router (S42). That is, the central control device 52B determines whether or not there is an input/output terminal for which breakdown information should be generated. Specifically, the central control device 52B determines whether or not there is a power router that has not yet been processed among the power routers for which all the breakdown information of the input power has already been generated.

When there is an unselected power router, the central control device 52B selects the unselected power router (S43). At this point, the breakdown information of the input/output terminals 110B and 120B has already been generated in the step S41, the central control device 52B selects the power router 100B.

The central control device 52B generates breakdown information of an output terminal (S44). That is, the central control device 52B generates second breakdown information including an energy output from the selected power router and identification information of the power transmission source of the output power based on a measurement tag. For example, the central control device 52B first identifies an input/output terminal 140B, which is the output terminal in the selected power router 100B. Then, the central control device 52B determines that the power transmission source of the input/output terminal 140B is the input/output terminals 110B and 120B based on the power transmission route information 5243. Then the central control device 52B calculates a breakdown energy for each power transmission source by using the below-shown Expression (1).

(Breakdown energy)=(Measurement value in power transmission source)/(Measurement value in all power transmission sources)×(Measurement value in power transmission destination) (1)

For example, the central control device 52B refers to the measurement tags MT1 and MT3 for the input/output terminal 110B, which is one of the power transmission sources, and calculates a breakdown energy as "9.1 kWh" by Expression (1) (FIG. 34). The central control device 52B also calculates breakdown energy for the input/output terminal 120B, which is also one of the power transmission sources, in a similar manner.

Next, the central control device 52B generates breakdown information for the input terminal at the connection destination (S45). That is, the central control device 52B generates first breakdown information in the other power router connected to the selected power router by using a measurement tag in an input/output terminal part in the other power router. In this way, it is possible to generate breakdown information in which power losses are taken into account. For example, the central control device 52B refers to the power transmission route information 5243 and thereby identifies an input/output terminal 210B as the connection destination of the input/output terminal 140B. Note that the input/output terminal 210B is an input/output terminal in the other power router 200B connected to the above-described selected power router 100B. Further, the central control device 52B refers to the power transmission route information 5243 and thereby determines that the power transmission sources of the input/output terminal 210B are the input/output terminals 110B and 120B. Then, the central control device 52B calculates breakdown power for each power transmission source by using the above-shown Expression (1).

For example, the central control device 52B refers to the measurement tags MT3 and MT4 for the input/output terminal 110B, which is one of the power transmission sources, and calculates breakdown power as "8.2 kWh" by Expression (1) (FIG. 34). The central control device 52B also calculates breakdown power for the input/output terminal 120B, which is also one of the power transmission sources, in a similar manner.

After that, the process returns to the step S42. Since there is an unselected power router 200B, the process proceeds to the step S43. At this point, the breakdown information of the input/output terminals 220B and 210B has already been generated in the steps S41 and S45, the central control device 52B selects the power router 200B.

Next, the central control device 52B identifies an input/output terminal 230B as the output terminal in the selected power router 200B. Then, the central control device 52B determines that the power transmission sources of the input/output terminal 230B are the input/output terminals 110B, 120B and 220B based on the power transmission route information 5243. Then, the central control device 52B refers to the measurement tags MT4 and MT6 for the input/output terminal 110B, which is one of the power transmission sources, and calculates breakdown power as "7.5 kWh" by Expression (1) (FIG. 34). The central control device 52B also calculates breakdown power for the input/output terminals 120B and 220B, which are also power transmission sources, in a similar manner.

Since there is no input terminal of the connection destination of the input/output terminal 230B (S45) and there is no unselected power router (S42), the central control device 52B generates power tags (S46). That is, the central control device 52B generates power tags based on the first breakdown information and the second breakdown information. Note that a power tag may be generated in each of the steps S41, S44 and S45. For example, the central control device 52B generates each pf power tags PT1 to PT10 shown in FIG. 35 based on breakdown information shown in FIGS. 33 and 34, and stores the generated power tags PT1 to PT10 into the hard disk drive 524.

By using measurement tags and power tags according to the second exemplary embodiment as described above, various information items related to power flowing in the power network system 10B can be managed. Examples of the information items include a measurement time, a measurement point (locations of a power router and an input/output terminal), a measured value, additional information, and so on. Further, a breakdown of mixed power can also be recognized by using the above-described breakdown information. Therefore, the central control device 52B may store the breakdown information into the hard disk drive 524.

Third Exemplary Embodiment of the Invention

In a third exemplary embodiment of the present invention, the above-described second exemplary embodiment is modified. That is, a central control device according to a third exemplary embodiment of the present invention resets (i.e., creates), when an abnormality related to an intermediate input/output terminal part is detected, power transmission route information for transmitting power equivalent to a predetermined amount of power to a power transmission destination without using the input/output terminal part where the abnormality is detected among input/output terminal parts of a plurality of power routers. In this way, even when power cannot be transmitted through the originally-set power transmission route, power can be interchanged in accordance with a contract by transmitting the power through an alternate route.

Further, a control unit according to the third exemplary embodiment of the present invention transmits a measurement tag to a central control device while making the status of the measurement tag an undetermined status, and the central control device changes the status of the received measurement tag to a determined status when there is no abnormality related to an input/output terminal part corresponding to the measurement tag in a measurement time included in the measurement tag, and stores that measurement tag into a storage device. This can improve the reliability of the measurement tag.

Further, when a control unit in a power router detects an abnormality for an input/output terminal in which power is measured in a measurement time period, the control unit may set, for example, "abnormality (C, T)" or the like in a status attribute of the measurement tag. Note that "C" may be a cause of the abnormality. For example, "stop", "power shortage", or the like may be set. Further, "T" may be a time period in which the abnormality occurs. For example, "10:01:31-10:01:47" or the like may be set. This can enable a measurement tag to manage an effective time period.

Further, when the central control device resets (i.e., creates) an alternate power transmission route and power starts to flow again, the central control device may set "restoration (T)" in a status attribute of a measurement tag that is generated for an input/output terminal forming the alternate route. Note that "T" may be a measurement time period in power transmission through the alternate route. For example, "10:01:58-10:10:00" or the like may be set.

Other Exemplary Embodiments of the Invention

Note that regarding the first and second power transmission sources in the above-described first exemplary embodiment, the first power transmission source may be an entity with which a transaction is contracted and the second power transmission source may be a supplementary power supply source. That is, the first exemplary embodiment can be applied when power losses can be ignored.

Further, in the first exemplary embodiment, no power may be supplied from the second power transmission source. That is, in a state where: one input/output terminal part in one power router among a plurality of power routers is a first power transmission source; and one input/output terminal part in another power router is a power transmission destination, when a predetermined amount of power is transmitted from the first power transmission source to the power transmission destination, power information about power received in the power transmission destination may include identification information of the first power transmission source and an intermediate measurement value that is a measurement value of power received in an intermediate input/output terminal part that is an input/output terminal part in a power router located on a power transmission route of the predetermined amount of power and is different from the first power transmission source and the power transmission destination.

Further, the present invention is not limited to the above-described exemplary embodiments, and needless to say, various modifications can be made without departing from the spirit and scope of the present invention described above. For example, although the present invention is described as a hardware configuration in the above-described exemplary embodiments, the present invention is not limited to the hardware configurations. In the present invention, arbitrary processing can be also implemented by causing a CPU (Central Processing Unit) to execute a computer program.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, a DVD (Digital Versatile Disc), a BD (Blu-ray (registered trademark) Disc), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2013-012197, filed on Jan. 25, 2013, the disclosure of which is incorporated herein in its entirety by reference.

REFERENCE SIGNS LIST

10 POWER NETWORK SYSTEM
10A POWER NETWORK SYSTEM
10B POWER NETWORK SYSTEM
11 CORE SYSTEM
12 LARGE-SCALE POWER PLANT
21 POWER CELL
22 POWER CELL
23 POWER CELL
24 POWER CELL
30 LOAD
31 HOUSE
32 BUILDING
33 SOLAR GENERATOR PANEL
34 WIND TURBINE
35 POWER STORAGE FACILITY (STORAGE BATTERY)
35A STORAGE BATTERY
35B STORAGE BATTERY
41 POWER ROUTER
42 POWER ROUTER
43 POWER ROUTER
44 POWER ROUTER
50 MANAGEMENT SERVER
51 COMMUNICATION NETWORK
52 CENTRAL CONTROL DEVICE
52B CENTRAL CONTROL DEVICE
521 CPU
522 MEMORY
523 COMMUNICATION UNIT
524 HARD DISK DRIVE
5241 POWER TRANSMISSION CONTROL PROGRAM
5242 INPUT/OUTPUT TERMINAL SETTING INFORMATION
5243 POWER TRANSMISSION ROUTE INFORMATION
5244 MEASUREMENT TAG
5245 POWER TAG
5246 POWER TRANSMISSION/RECEPTION TRANSACTION CONTRACT INFORMATION
5247 CORRESPONDENCE RELATION MANAGEMENT INFORMATION
100 (FIRST) POWER ROUTER
101 DC BUS

102 SMOOTHING CAPACITOR
103 VOLTAGE SENSOR
110 FIRST LEG
111 POWER CONVERSION UNIT
111D FEEDBACK DIODE
111P REVERSE-PARALLEL CIRCUIT
111T THYRISTOR
112 CURRENT SENSOR
113 SWITCH
114 VOLTAGE SENSOR
115 CONNECTION TERMINAL
120 LEG
121 POWER CONVERSION UNIT
122 CURRENT SENSOR
123 SWITCH
124 VOLTAGE SENSOR
125 CONNECTION TERMINAL
130 LEG
135 CONNECTION TERMINAL
140 LEG
145 CONNECTION TERMINAL
150 LEG
151 POWER CONVERSION UNIT
152 CURRENT SENSOR
153 SWITCH
154 VOLTAGE SENSOR
155 CONNECTION TERMINAL
180 STORAGE UNIT
181 PRIORITY TABLE
190 CONTROL UNIT
200 SECOND POWER ROUTER
201 DC BUS
210 FIRST LEG (STAND-ALONE LEG)
220 SECOND LEG (MASTER LEG)
230 THIRD LEG
240 FOURTH LEG
250 FIFTH LEG
300 THIRD POWER ROUTER
301 DC BUS
310 DESIGNATED POWER TRANSMISSION/RECEPTION LEG
320 MASTER LEG
400 FOURTH POWER ROUTER
401 DC BUS
410 STAND-ALONE LEG
420 MASTER LEG
500 FIFTH POWER ROUTER
501 DC BUS
600 SIXTH POWER ROUTER
601 DC BUS
BL BRANCH LINE
100A POWER ROUTER
101A DC BUS
110A INPUT/OUTPUT TERMINAL
120A INPUT/OUTPUT TERMINAL
190A CONTROL UNIT
200A POWER ROUTER
201A DC BUS
210A INPUT/OUTPUT TERMINAL
220A INPUT/OUTPUT TERMINAL
230A INPUT/OUTPUT TERMINAL
290A CONTROL UNIT
100B POWER ROUTER
101B DC BUS
110B INPUT/OUTPUT TERMINAL
120B INPUT/OUTPUT TERMINAL
130B INPUT/OUTPUT TERMINAL
140B INPUT/OUTPUT TERMINAL
190B CONTROL UNIT
200B POWER ROUTER
201B DC BUS
210B INPUT/OUTPUT TERMINAL
220B INPUT/OUTPUT TERMINAL
230B INPUT/OUTPUT TERMINAL
240B INPUT/OUTPUT TERMINAL
290B CONTROL UNIT
C1-C3 CONTRACT
ST1-ST4 SETTING
RT1-RT5 ROUTE
MT1-MT6 MEASUREMENT TAG
PT1-PT10 POWER TAG

The invention claimed is:
1. A power network system comprising:
a plurality of power cells each comprising a power router for an asynchronous connection with an external power system, wherein
the power router comprises:
a DC (direct current) bus whose voltage is controlled to be maintained at a voltage level;
a plurality of input/output terminal parts, having one end connected to the DC bus and another end communicatively coupled to a connection partner, each of the plurality of input/output terminal parts allowing flow of power between the DC bus and the connection partner to flow bi-directionally; and
a control unit for controlling the plurality of input/output terminal parts, wherein a plurality of power routers including at least a first power router and a second power router are connected through respective input/output terminal parts in a multi-stage configuration,
in a state where:
one input/output terminal part in the first power router is a first power transmission source;
one input/output terminal part in the second power router is a second power transmission source; and
another input/output terminal part in the second power router is a power transmission destination,
a predetermined amount of power is transmitted to the input/output terminal part of the power transmission destination through a first input/output terminal part, the input/output terminal part of the second power transmission source, and the DC bus in the second power router, the first input/output terminal part being an input/output terminal part among the plurality of input/output terminal parts in the second power router that receives power from the first power transmission source, and
the power network system comprises power information about power in the input/output terminal part of the power transmission destination, the power information including:
identification information of the first power transmission source; and
an intermediate measurement value, the intermediate measurement value being a measurement value of power received in the first input/output terminal part in a predetermined time period, and wherein,
the power network system further comprises a central control device connected to the plurality of power routers through a network, wherein
the input/output terminal part measures received power and notifies the control unit of the measured measurement value, the control unit generates a measurement tag including the notified measurement value, a measurement time period, identification information of the measured input/output terminal part, and identification information of the power router, and transmits the generated measurement tag to the central control device, and the central control device generates the power information based on the measurement tag received from the control unit of each power router through which the predetermined amount of power is transmitted, and wherein the control unit transmits the measurement tag to the central control device while making the status of the measurement tag an undetermined status, and the central control device changes the status of the received measurement tag to a determined status when there is no abnormality related to an input/output terminal part corresponding to the measurement tag in a measurement time period included in the measurement tag, and stores that measurement tag into a storage device.

2. The power network system according to claim 1, wherein a supply source of power transmitted from the second power transmission source is a supplementary power supply source for adjusting excess/deficiency of power transmitted from the first power transmission source in the transmission of the predetermined amount of power.

3. The power network system according to claim 1, further comprising a central control device connected to the plurality of power routers through a network, wherein the central control device defines a connection relation of each input/output terminal part and thereby sets power transmission route information based on contract information for transmitting the predetermined amount of power from the first power transmission source to the power transmission destination, and the central control device instructs the plurality of power routers to transmit the predetermined amount of power based on the power transmission route information.

4. The power network system according to claim 3, wherein the central control device resets, when an abnormality related to the first input/output terminal part is detected, the power transmission route information for transmitting power equivalent to the predetermined amount of power to the power transmission destination without using the first input/output terminal part where the abnormality is detected among input/output terminal parts of the plurality of power routers.

5. The power network system according to claim 1, wherein the central control device generates, as the power information, a power tag including information about a power transmission source for an input/output terminal part included in the received measurement tag by using that measurement tag.

6. The power network system according to claim 1, wherein the central control device identifies a power transmission source of power received in each input/output terminal part in each power router based on power transmission route information in which a connection relation of each input/output terminal part in each power router through which the predetermined amount of power is transmitted is defined, and the central control device generates the power information by using the measurement tag for the identified power transmission source.

7. The power network system according to claim 1, wherein the central control device:

selects an input/output terminal part among input/output terminal parts in the plurality of power routers that receives power from the external power system;

generates first breakdown information including an energy received in the selected input/output terminal part and identification information of a power transmission source of the received power based on the measurement tag;

selects a power router where the first breakdown information is generated;

generates second breakdown information including an energy output from the selected power router and identification information of a power transmission source of the output power based on the measurement tag;

generates the first breakdown information in another power router connected to the selected power router by using the measurement tag in the input/output terminal part in the another power router; and generates the power information based on the first breakdown information and the second breakdown information.

8. The power network system according to claim 1, wherein the control unit operates and controls the plurality of input/output terminal parts in a predetermined operating mode, the operating mode includes a master mode, the master mode being an operating mode in which the input/output terminal part is operated so that a voltage of the DC bus is maintained at the predetermined rated voltage, and the second power transmission source is an input/output terminal part operated and controlled in the master mode.

9. The power network system according to claim 1, further comprising a central control device connected to the plurality of power routers through a network, wherein the first input/output terminal part measures the intermediate measurement value and transmits the measured intermediate measurement value to the central control device by the control unit, the central control device identifies the first power transmission source based on power transmission route information in which each input/output terminal part in each power router through which the predetermined amount of power is transmitted is defined, and the central control device generates the power information including the intermediate measurement value and identification information of the identified first power transmission source.

10. A power identification method using:

a plurality of power routers comprising:

a DC (direct current) bus whose voltage is controlled to be maintained at a voltage level;

a plurality of input/output terminal parts, having one end connected to the DC bus and another end communicatively coupled to a connection partner, each of the plurality of input/output terminal parts allowing flow of power between the DC bus and the connection partner to flow bi-directionally;

a control unit for controlling the plurality of input/output terminal parts; and a central control device connected to the plurality of power routers through a network, wherein a plurality of power routers including at least a first power router and a second power router are connected through respective input/output terminal parts in a multi-stage configuration, the central control device defines a connection relation of each input/output terminal part and sets power transmission route information so that: one input/output terminal part in the first power router is a first power transmission source; one input/output terminal part in the second power router is a second power transmission source; another input/output terminal part in the second power router is a power transmission destination; and a predetermined amount of power is transmitted to the input/output terminal part of the power transmission destination through a first input/output terminal part, the input/output terminal part of the second power transmission source, and the DC bus in the second power router, the first input/output terminal part being an input/output terminal part among the plurality of input/output terminal parts in the second power router that receives power from the first power transmission source, and wherein the input/output terminal part measures received power and notifies the control unit of the measured measurement value, the control unit generates a measurement tag including the notified measurement value, a measurement time period, identification information of the measured input/output terminal part, and identification information of the power router, and transmits the generated measurement tag to the central control device, and the central control device generates the power information based on the measurement tag received from the control unit of each power router through which the predetermined amount of power is transmitted, and wherein the central control device generates, as the power information, a power tag including information about a power transmission source for an input/output terminal part included in the received measurement tag by using that measurement tag, and wherein the central control device:
selects an input/output terminal part among input/output terminal parts in the plurality of power routers that receives power from the external power system;
generates first breakdown information including energy received in the selected input/output terminal part and identification information of a power transmission source of the received power based on the measurement tag;
selects a power router where the first breakdown information is generated;
generates second breakdown information including energy output from the selected power router and identification information of a power transmission source of the output power based on the measurement tag;
generates the first breakdown information in another power router connected to the selected power router by using the measurement tag in the input/output terminal part in the another power router; and
generates the power tag based on the first breakdown information and the second breakdown information.

11. The power identification method according to claim 10, wherein the central control device identifies a power transmission source of power received in each input/output terminal part in each power router through which the predetermined amount of power is transmitted based on the power transmission route information, and the central control device generates the power information by using the measurement tag for the identified power transmission source.

12. A power network system comprising:

a plurality of power routers; and a plurality of power cells each comprising at least one power router among the plurality of power routers for an asynchronous connection with an external power system, wherein each of the plurality of power routers comprises:
a DC (direct current) bus whose voltage is controlled to be maintained at a voltage level;
a plurality of input/output terminal parts, having one end connected to the DC bus and another end communicatively coupled to a connection partner, each of the plurality of input/output terminal parts allowing flow of power between the DC bus and the connection partner to flow bi-directionally; and
a control unit for controlling the plurality of input/output terminal parts,
wherein the plurality of power routers including at least a first power router and a second power router are connected through respective input/output terminal parts in a multi-stage configuration, and
wherein the plurality of input/output terminal parts in the second power router include at least first, second and third input/output terminal parts;

in a state where:
one input/output terminal part among the plurality of input/output terminal parts in the first power router is a first power transmission source;
the first input/output terminal part receives power from the first power transmission source;
the second input/output terminal part is a second power transmission source; and
the third input/output terminal part is a power transmission destination, a predetermined amount of power is transmitted from the first power transmission source and the second power transmission source to the power transmission destination through the first input/output terminal part, the second input/output terminal part, and the DC bus in the second power router, and the power network system comprises power information about power in the third input/output terminal part;

the power information including
identification information of the first power transmission source; and
an intermediate measurement value, the intermediate measurement value being a measurement value of power received in the first input/output terminal part in a predetermined time period, the power network system further comprises a central control device connected to the plurality of power routers through a network, wherein the input/output terminal part measures received power and notifies the control unit of the measured measurement value, the control unit generates a measurement tag including the notified measurement value, a measurement time period, identification information of the measured input/output terminal part, and identification information of the power router, and transmits the generated measurement tag to the central control device, and the central control device:

generates the power information based on the measurement tag received from the control unit of each power router through which the predetermined amount of power is transmitted identifies a power transmission source of power received in each input/output terminal part in each power router based on power transmission route information in which a connection relation of each input/output terminal part in each power router through which the predetermined amount of power is transmitted is defined, and generates the power information by using the measurement tag for the identified power transmission source.

13. The power network system according to claim 12, wherein a supply source of power transmitted from the second power transmission source is a supplementary power supply source for adjusting excess/deficiency of power transmitted from the first power transmission source in the transmission of the predetermined amount of power.

14. The power network system according to claim 12, further comprising a central control device connected to the plurality of power routers through a network, wherein the central control device defines a connection relation of each input/output terminal part and thereby sets power transmission route information based on contract information for transmitting the predetermined amount of power from the first power transmission source to the power transmission destination, and the central control device instructs the plurality of power routers to transmit the predetermined amount of power based on the power transmission route information.

15. The power network system according to claim 12, wherein the central control device generates, as the power information, a power tag including information about a power transmission source for an input/output terminal part included in the received measurement tag by using that measurement tag.

16. The power network system according to claim 12, wherein the central control device identifies a power transmission source of power received in each input/output terminal part in each power router based on power transmission route information in which a connection relation of each input/output terminal part in each power router through which the predetermined amount of power is transmitted is defined, and the central control device generates the power information by using the measurement tag for the identified power transmission source.

17. The power network system according to claim 12, wherein the central control device:

selects an input/output terminal part among input/output terminal parts in the plurality of power routers that receives power from the external power system;

generates first breakdown information including an energy received in the selected input/output terminal part and identification information of a power transmission source of the received power based on the measurement tag;

selects a power router where the first breakdown information is generated;

generates second breakdown information including an energy output from the selected power router and identification information of a power transmission source of the output power based on the measurement tag;

generates the first breakdown information in another power router connected to the selected power router by using the measurement tag in the input/output terminal part in the another power router; and generates the power information based on the first breakdown information and the second breakdown information.

18. The power network system according to claim 12, wherein the control unit operates and controls the plurality of input/output terminal parts in a predetermined operating mode, the operating mode includes a master mode, the master mode being an operating mode in which the input/output terminal part is operated so that a voltage of the DC bus is maintained at the predetermined rated voltage, and the second power transmission source is an input/output terminal part operated and controlled in the master mode.

19. The power network system according to claim 12, further comprising a central control device connected to the plurality of power routers through a network, wherein the first input/output terminal part measures the intermediate measurement value and transmits the measured intermediate measurement value to the central control device by the control unit, the central control device identifies the first power transmission source based on power transmission route information in which each input/output terminal part in each power router through which the predetermined amount of power is transmitted is defined, and the central control device generates the power information including the intermediate measurement value and identification information of the identified first power transmission source.

20. A power network system comprising:

a plurality of power routers; and a plurality of power cells each comprising at least one power router among the plurality of power routers for an asynchronous connection with an external power system, wherein each of the plurality of power routers comprises:

a DC (direct current) bus whose voltage is controlled to be maintained at a voltage level;

a plurality of input/output terminal parts, having one end connected to the DC bus and another end communicatively coupled to a connection partner, each of the plurality of input/output terminal parts allowing flow of power between the DC bus and the connection partner to flow bi-directionally; and a control unit for controlling the plurality of input/output terminal parts, wherein the plurality of power routers including at least a first power router and a second power router are connected through respective input/output terminal parts in a multi-stage configuration, and wherein the plurality of input/output terminal parts in the second power router include at least first, second and third input/output terminal parts;

in a state where:
one input/output terminal part among the plurality of input/output terminal parts in the first power router is a first power transmission source;
the first input/output terminal part receives power from the first power transmission source;
the second input/output terminal part is a second power transmission source; and
the third input/output terminal part is a power transmission destination, a predetermined amount of power is transmitted from the first power transmission source and the second power transmission source to the power transmission destination through the first input/output terminal part, the second input/output terminal part, and the DC bus in the second power router, and the power network system comprises power information about power in the third input/output terminal part;

the power information including
identification information of the first power transmission source; and
an intermediate measurement value, the intermediate measurement value being a measurement value of power received in the first input/output terminal part in a predetermined time period the power network system further comprises a central control device connected to the plurality of power routers through a network, wherein
the input/output terminal part measures received power and notifies the control unit of the measured measurement value,
the control unit generates a measurement tag including the notified measurement value, a measurement time period, identification information of the measured input/output terminal part, and identification information of the power router, and transmits the generated measurement tag to the central control device, and the central control device:
generates the power information based on the measurement tag received from the control unit of each power router through which the predetermined amount of power is transmitted, and
selects an input/output terminal part among input/output terminal parts in the plurality of power routers that receives power from the external power system;
generates first breakdown information including an energy received in the selected input/output terminal part and identification information of a power transmission source of the received power based on the measurement tag;
selects a power router where the first breakdown information is generated;
generates second breakdown information including an energy output from the selected power router and identification information of a power transmission source of the output power based on the measurement tag;
generates the first breakdown information in another power router connected to the selected power router by using the measurement tag in the input/output terminal part in the another power router; and
generates the power information based on the first breakdown information and the second breakdown information.

* * * * *